(12) United States Patent
Fliearman et al.

(10) Patent No.: US 11,376,956 B2
(45) Date of Patent: Jul. 5, 2022

(54) TANDEM WHEEL ASSEMBLY WITH PIVOT DAMPENING SYSTEM

(71) Applicant: Deere & Company, Moline, IL (US)

(72) Inventors: Steven R. Fliearman, Coffeyville, KS (US); Prashant Shinde, Pune (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/075,144

(22) Filed: Oct. 20, 2020

(65) Prior Publication Data

US 2022/0118848 A1 Apr. 21, 2022

(51) Int. Cl.
*B60K 17/36* (2006.01)
*B60G 3/14* (2006.01)
(Continued)

(52) U.S. Cl.
CPC .............. *B60K 17/36* (2013.01); *B60G 3/145* (2013.01); *B60G 5/02* (2013.01); *B60G 13/04* (2013.01);
(Continued)

(58) Field of Classification Search
CPC .... B60K 17/36; B60K 17/043; B60K 17/046; F16D 13/54; F16D 25/0635;
(Continued)

(56) References Cited

U.S. PATENT DOCUMENTS 2,819,910 A  1/1958  Walter
3,166,142 A  1/1965  Frazier
(Continued)

FOREIGN PATENT DOCUMENTS

CN   201192987 Y   2/2009
GB      567097 A   1/1945

OTHER PUBLICATIONS

John Deere, 317 and 320 Skid Steers, Introduction and Customer Information, T198465A A.1, Manufactured 2004-2009.
(Continued)

*Primary Examiner* — James A English
*Assistant Examiner* — Daniel M. Keck
(74) *Attorney, Agent, or Firm* — Klintworth & Rozenblat IP LLP

(57) ABSTRACT

A tandem wheel assembly for a work vehicle includes a tandem wheel housing having a center opening extending along a pivot axis and wheel end openings extending along associated wheel end axes. The tandem wheel housing is pivotally mounted to a chassis of the work vehicle about the pivot axis. A center sprocket is rotatably disposed within the tandem wheel housing. Wheel end assemblies are disposed at the wheel end openings and each includes a wheel end sprocket, a wheel end gear train, and a wheel end hub. A pair of reaction bars are being pivotally coupled at first ends to the chassis and at second ends to a component of the respective wheel end assembly. A pivot dampening system is positioned, at least in part, axially between the tandem wheel housing and either the chassis or the component of at least one of the wheel end assemblies. The pivot dampening system is configured to dampen the pivoting of the tandem wheel housing tandem wheel housing relative to the chassis.

20 Claims, 15 Drawing Sheets

(51) Int. Cl.
*B60G 5/02* (2006.01)
*B60K 17/04* (2006.01)
*F16D 13/54* (2006.01)
*F16D 25/0638* (2006.01)
*F16H 37/02* (2006.01)
*B60G 13/04* (2006.01)

(52) U.S. Cl.
CPC ............ *B60K 17/046* (2013.01); *F16D 13/54* (2013.01); *F16D 25/0638* (2013.01); *F16H 37/02* (2013.01); *B60G 2200/13* (2013.01); *B60G 2200/42* (2013.01); *B60G 2202/23* (2013.01); *B60G 2202/413* (2013.01); *F16H 2702/02* (2013.01)

(58) Field of Classification Search
CPC ....... F16D 25/0638; B60G 3/14; B60G 3/145; B60G 5/02; B60G 13/02; B60G 13/04; B60G 2202/413; B60G 2202/23; B60G 2200/42; B60G 2200/13; F16H 37/02; F16H 2702/02
See application file for complete search history.

(56) References Cited

U.S. PATENT DOCUMENTS

| | | |
|---|---|---|
| 3,450,221 A | 6/1969 | Nelson |
| 3,786,888 A | 1/1974 | Nelson |
| 3,792,871 A | 2/1974 | Chalmers |
| 4,535,860 A | 8/1985 | Waggoner |
| 4,646,880 A | 3/1987 | Logan |
| 5,016,905 A | 5/1991 | Licari |
| 5,417,297 A | 5/1995 | Auer |
| 7,229,094 B2 | 6/2007 | Miller et al. |
| 7,296,642 B1 | 11/2007 | DeWald |
| 7,832,509 B2 | 11/2010 | Thomson et al. |
| 7,954,574 B2 | 6/2011 | Schoon |
| 8,262,125 B2 | 9/2012 | Sergison et al. |
| 9,242,556 B2 | 1/2016 | Ziech et al. |
| 9,358,880 B2 | 6/2016 | Bindl |
| 9,868,322 B1 | 1/2018 | Varela |
| 10,106,010 B2 | 10/2018 | Fliearman |
| 10,434,836 B2 | 10/2019 | Fliearman |
| 2005/0045390 A1 | 3/2005 | Lamela et al. |
| 2008/0230284 A1 | 9/2008 | Schoon |
| 2016/0263987 A1* | 9/2016 | Brownell .............. B60B 35/125 |
| 2018/0065439 A1 | 3/2018 | Fliearman |
| 2018/0065440 A1 | 3/2018 | Fliearman |
| 2019/0001772 A1* | 1/2019 | Dyna .................... B62D 21/183 |
| 2019/0331173 A1* | 10/2019 | Eschenburg ........... B60K 17/02 |

OTHER PUBLICATIONS

John Deere, 317 and 320 Skid Steers PC9347 Parts List—50 Power Train, undated, admitted prior art.
John Deere, Drive Chains and Sprockets—ST119001, 317 and 320 Skid Steers PC9347—50 Power Train Parts List, undated, admitted prior art.
John Deere, Axle ST119002, 317 and 320 Skid Steers PC9347—50 Power Train Parts List, undated, admitted prior art.
John Deere, Image of Fixed Axle Drive, undated, admitted prior art.
Tigercat, H-Series Skidders, 620H | 630H | 632H | 625H | 635H Brochure © 2001-2020.
Tigercat Bogie Skidder Image, undated admitted prior art.
NAF Bogie Axles for Your Heavy Duty Playgrounds Brochure, 2019.
European Extended Search Report for U.S. Appl. No. 17/184,539 dated Jan. 10, 2018.
USPTO Ex Parte Quayle Action for U.S. Appl. No. 15/255,860 issued Apr. 5, 2018.
USPTO Utility U.S. Appl. No. 16/852,117, filed Apr. 17, 2020.
USPTO Utility U.S. Appl. No. 17/068,159, filed Oct. 12, 2020.
German Search Report issued in application No. DE102021203728.3 dated Feb. 14, 2022 (06 pages).
German Search Report issued in application No. DE102021207440.5 dated Mar. 17, 2022 (17 pages).

* cited by examiner

TANDEM WHEEL ASSEMBLY WITH PIVOT DAMPENING SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and, more particularly, to tandem wheel assemblies for work vehicles.

BACKGROUND OF THE DISCLOSURE

Work vehicles, such as used in forestry, construction, agriculture, mining and other industries, may utilize tandem wheel assemblies (also known as bogie axles) to support significant loads across four or more ground-engaging or track wheels utilizing a single axle that allows the wheels to pivot together to maintain ground contact over varying terrain without significantly shifting other areas of the work vehicle, including an operator cabin and a work implement (e.g., a crane). Such tandem wheel assemblies may also be driven (e.g., from the work vehicle powertrain through a transmission or may be powered themselves). One work vehicle that often utilizes a tandem wheel assembly is a forwarder used in tree harvesting operations. Applications may require the forwarder to deliver high-torque, and possibly low-speed, power to the ground-engaging wheels, which is achieved through a high-ratio gear reduction to the wheels. Different applications may be suitable for different forwarders or other machine platforms with different load-carrying capabilities.

SUMMARY OF THE DISCLOSURE

The disclosure provides a work vehicle tandem wheel assembly with a pivot dampening system.

In one aspect, the disclosure provides a tandem wheel assembly for a work vehicle having a chassis and wheels. The tandem wheel assembly includes a tandem wheel housing defining a center opening extending along a pivot axis and wheel end openings extending along associated wheel end axes, the tandem wheel housing being pivotally mounted to the chassis about the pivot axis. A center sprocket is disposed within the tandem wheel housing and is rotatable with respect to the tandem wheel housing. A wheel end assembly is disposed at each of the wheel end openings and each has a wheel end sprocket, a wheel end gear train, and a wheel end hub. Each wheel end sprocket is supported within the tandem wheel housing for rotation by at least one chain coupled to the center sprocket. Each wheel end gear train is coupled for rotation by the associated wheel end sprocket and configured to effect a gear ratio change and rotate the associated wheel end hub about the associated wheel end axis. A pair of reaction bars are each pivotally coupled at a first end to the chassis and at an opposite second end to a component of the respective wheel end assembly. A pivot dampening system is at least in part positioned axially between the tandem wheel housing and either the chassis or the component of at least one of wheel end assemblies. The pivot dampening system is configured to dampen the pivoting of the tandem wheel housing relative to the chassis.

In another aspect, the disclosure provides a tandem wheel assembly that includes a tandem wheel housing defining a center opening extending along a pivot axis and wheel end openings extending along associated wheel end axes, the tandem wheel housing being pivotally mounted to the chassis about the pivot axis. A center sprocket is disposed within the tandem wheel housing and is rotatable with respect to the tandem wheel housing. A wheel end assembly is disposed at each of the wheel end openings and each has a wheel end sprocket, a wheel end gear train, and a wheel end hub. Each wheel end sprocket is supported within the tandem wheel housing for rotation by at least one chain coupled to the center sprocket. Each wheel end gear train is coupled for rotation by the associated wheel end sprocket and configured to effect a gear ratio change and rotate the associated wheel end hub about the associated wheel end axis. A pair of reaction bars are each pivotally coupled at a first end to the chassis and at an opposite second end to a component of the respective wheel end assembly. A pivot dampening system is configured to dampen the pivoting of the tandem wheel housing relative to the chassis. The pivot dampening system includes a clutch assembly positioned axial between the tandem wheel housing and either the chassis or the component of the at least one wheel end assemblies. The clutch assembly includes a plurality of discs, some of which are rotationally fixed to the tandem wheel housing and some of which are rotationally fixed to the chassis, and an actuator that causes the discs to engage or disengage.

In yet another aspect, the disclosure provides a tandem wheel assembly that includes a tandem wheel housing defining a center opening extending along a pivot axis and wheel end openings extending along associated wheel end axes. A pivot cage is disposed within the center opening to allow the tandem wheel housing to pivot about the pivot axis. The pivot cage is fixedly mounted to the chassis. A center sprocket is disposed within the pivot cage and rotatable with respect to the tandem wheel housing. A wheel end assembly is disposed at each of the wheel end openings and each has a wheel end sprocket, a wheel end gear train including planetary gear set having a ring gear, and a wheel end hub. Each wheel end sprocket is supported within the tandem wheel housing for rotation by at least one chain coupled to the center sprocket. Each wheel end gear train is coupled for rotation by the associated wheel end sprocket and configured to effect a gear ratio change and rotate the associated wheel end hub about the associated wheel end axis. A pair of reaction bars are each pivotally coupled at a first end to the pivot cage at a location spaced from the pivot axis and at an opposite second end to the ring gear of the respective wheel end assembly. A pivot dampening system is configured to dampen the pivoting of the tandem wheel housing relative to the chassis. The pivot dampening system includes a clutch assembly at least in part positioned axially between the tandem wheel housing and ring gear of the respective wheel end assembly. The clutch assembly has a plurality of discs, some of which are rotationally fixed to the tandem wheel housing and some of which are fixed to the ring gear of the respective wheel end assembly, and an actuator positioned within the tandem wheel housing that causes the discs to engage or disengage.

The details of one or more embodiments are set forth in the accompanying drawings and the description below.

Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
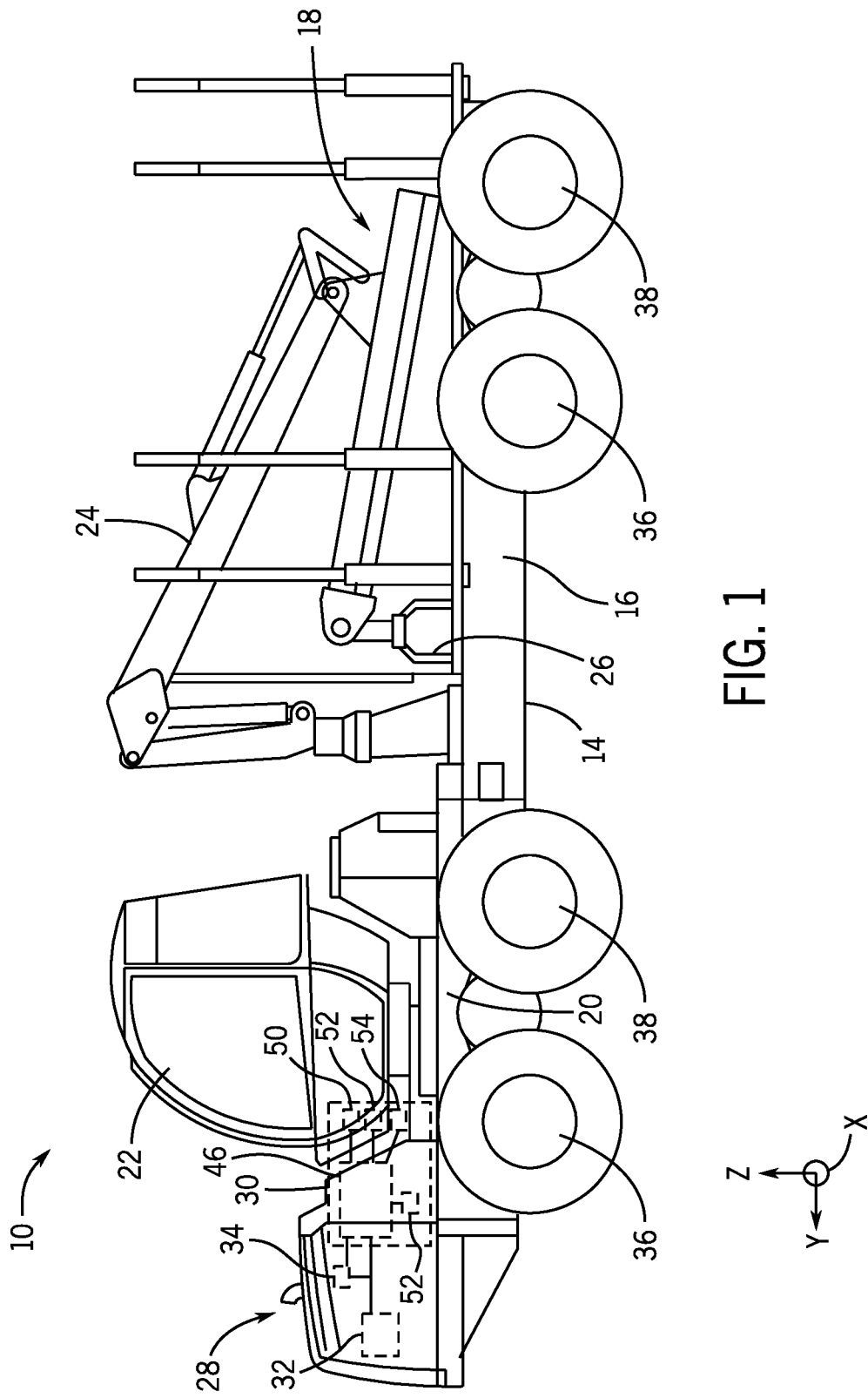
FIG. 1 is a simplified perspective view of an example work vehicle in the form of a tree harvesting forwarder in which a tandem wheel assembly having a pivot dampening system in accordance with this disclosure may be used.

The following describes one or more example embodiments of the disclosed tandem wheel assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "longitudinal," "inner," "outer," "radial," "axial," "circumferential," "lateral," and "transverse" may be used. Such terms are defined, at least in part, with respect to a wheel axle, pivot axis, and/or a work vehicle. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached. In other examples, the components referenced by those terms may be reversed in accordance with the present disclosure.

Overview

Work vehicles, such as tree harvesting forwarders, typically include components such as a chassis, power train (e.g., engine and drivetrain), suspension, and work implements (e.g., cranes) that implement tasks over a variety of terrain and conditions. Typically, the work vehicle may perform tasks that require consistent work implement positioning (e.g., crane grasping and moving felled trees). A wheel axle region may support significant static weight loads from on-board components (e.g., engine, transmission, axle, work implements, etc.) and encounter significant operating loads (e.g., via attached work implements and shocks/loads through the wheels and suspension). Therefore, the work vehicle must accommodate varying terrain, static loads, and operating loads resulting from the work tasks while maintaining the desired implement positioning. A tandem wheel assembly may accommodate such loads or changes in grade by mounting wheel assemblies, typically rear wheel assemblies, together to pivot relative to the work vehicle, providing ground contact for the wheel without significantly hindering work implement placement.

In the case of a tree harvesting forwarder, the work implement is typically a crane, which, during operation, lifts large, felled trees onto a load space of the forwarder. The forwarder carries quantities of felled trees and must travel at sufficient speed to be productive while preventing unwanted bouncing and rocking; for example, a forwarder may work at a speed range from slow speeds (e.g., 1-10 miles per hour (mph)) to higher speed ranges (e.g., 40 mph or more during transport and other operating states). During use, the forwarder experiences load forces in the weight of the felled trees and shocks from ground obstacles encountered during travel. The corresponding operating loads are transferred to and through the chassis and drivetrain to the wheels, which transfer the load to the ground surface. Accordingly, the drive train and wheels can contribute to performance of the forwarder by maintaining ground contact for consistent traction.

This disclosure provides a tandem wheel assembly with pivot dampening which is configured to provide improved ride stability and traction during operation of a work vehicle. When the work vehicle drives in a forward direction, the tandem wheel assembly follows behind the connection of the crane and the rear frame and supports most weight on the rear frame. During acceleration and deceleration of the work vehicle, or when the work vehicle traverses along an incline/decline or encounters an obstacle, a torque is applied to the tandem wheel assembly and the tandem wheel assembly may pivot in a clock direction relative to the chassis of the work vehicle. Reaction assemblies, which may form a walking beam configuration, of the tandem wheel assembly counteract the forces that cause the tandem wheel assembly to pivot in an opposite clock direction by applying a downforce that causes the tandem wheel assembly to pivot both wheels back into contact with the ground. The reaction assemblies work to drive the front or rearwheels back down into contact with the ground.

The tandem wheel assemblies, and the work vehicle in which they are incorporated, include pivot dampening systems that serves to further improve the tractive engagement of the wheels with the ground and the overall ride stability of the vehicle. The pivot dampening systems operate to impart a pivot-retarding, and in some cases braking or locking, force to the tandem wheel assemblies, and thereby to the front or rear wheels of the tandem wheel assemblies, to better distribute the downforce applied by the reaction assemblies. The pivot dampening systems may serve to inhibit, slow or prevent the pivoting of the tandem wheel assemblies from such events as acceleration changes, riding over obstacles, or riding on inclines/declines, thereby affecting the amount by which the tandem wheel assemblies pivot initially in response to such events, if at all. If the tandem wheel assemblies are allowed to pivot, the pivot dampening systems may also serve to inhibit or slow the counter-pivoting action, such as imparted by the downforce from the reaction assemblies, tending to return the tandem wheel assemblies to its prior wheel-to-ground engaging orientation. Generally, it may be desired to return the wheels in contact with the ground rapidly, however, the pivot dampening system allows for a preset or selectable dampening force to be applied in opposition to the downforce to achieve a desired balance between tractive and ride stability aspects of work vehicle. Thus, with the pivot dampening systems the tandem wheel assemblies may be sufficiently responsive to maintain or quickly return all of the wheels in contact with the ground to provide good tractive control of the work vehicle, while simultaneously avoiding excessively abrupt reactive downforces (i.e., cushioning the reactive downforces) to further improve tractive engagement of the wheels and to enhance the ride quality for the operator of the vehicle.

In certain embodiments, the pivot dampening system includes a clutch assembly having a plurality of discs, such as interleaved backing plates and friction discs, that cooperate to inhibit or lock relative pivoting of the tandem wheel assembly. For example, there may be a single, central clutch assembly disposed about a pivot axis of each tandem wheel assembly that affects pivoting. Alternatively, or additionally, there may be a clutch assembly at one or both wheel ends, such as about a rotation axis of each front and rear wheel of the tandem wheel assembly. In each case, each clutch assembly is configured to impart a dampening force to the tandem wheel assembly (e.g., by applying a force directly or indirectly to a tandem wheel housing of the tandem wheel assembly or to the reaction assemblies).

The pivot dampening system may be implemented actively or passively. Active implementation of the pivot dampening system may allow for enhanced control options and selective application of the pivot dampening. An active pivot dampening system may be achieved using an actuator to apply a selective force to the clutch assembly. For example, a hydraulic piston (e.g., with an apply or return spring in a spring applied hydraulic release or reverse configuration), may be actively controlled to engage or disengage the discs of the clutch assembly. An active pivot dampening system thus allows both the ability to select when and to what degree the dampening force is applied and also additional control settings to allow the tandem wheel assembly to pivot freely (i.e., zero dampening) or to be locked against pivoting (i.e., fully dampened). Using electronic control, the hydraulic piston may be operated selectively by the operator or under control algorithms that may set and apply dampening force according to certain vehicle operations or sensor inputs. By way of example, the pivot dampening system may be set to lock the tandem wheel assemblies against pivoting when roading the work vehicle, or may be set to apply a pre-selected or progressively increasing dampening force in response to a certain input from a sensor associated with the tandem wheel assemblies of the work vehicle Passive implementation may provide the tractive and ride quality improvements mentioned in a continuous manner and a mechanically and electronically less complex application. By way of example, a passive pivot dampening system may be achieved by applying a continuous or variable biasing force to the clutch assembly. In some embodiments, this is implemented with a spring (e.g., a Belleville spring) situated to apply a continuous biasing force to the discs of the clutch assembly, thereby applying a constant force resisting pivoting of the tandem wheel assembly in either clock direction (i.e., both the initial and the return pivotal clock directions). The biasing force is thus always present while allowing the tandem wheel assembly to pivot in either clock direction.

The following describes one or more example implementations of the disclosed tandem wheel housing having the pivot dampening system. While discussion herein may sometimes focus on the example application of a tandem wheel assembly of a tree harvesting forwarder, the disclosed tandem wheel assembly may also be applicable to bogie axles or tandem axles in other types of work vehicles, including self-propelled or towed work vehicles, as well as various other agricultural machines (e.g., articulated tractors, utility tractors, motor graders, front end loaders, harvesters and the like), various construction and forestry machines (e.g., skidders and so on), and transportation vehicles (e.g., semi-trailers).

Example Embodiments of the Tandem Wheel Assembly

Referring to FIG. 1, in some embodiments, the disclosed work vehicle 10 may be a tree harvesting forwarder, although, as noted, the tandem wheel assembly 12 described herein may be applicable to a variety of machines, such as motor graders, skidders, other construction vehicles, agricultural vehicles including articulated-frame tractors, other forestry vehicles, and transportation vehicles such as semi-trailers. As shown, the work vehicle 10 may be considered to include a chassis 14 constituted by a rear frame 16 having a load space 18 formed for the transportation of the felled trees and a front frame 20 having an operator cabin 22. The rear frame 16 and the front frame 20 may be connected by an articulated joint. A crane 24, intended for the manipulation of felled trees into the load space 18, is mounted to the rear frame 16 rearward of the operator cabin 22. At the head of the crane 24, a loading grapple 26 is provided, equipped with gripping members known as such, which are turned towards or away from each other by an actuator provided in them, wherein the loading grapple 26 can be used for gripping one or more tree trunks for hauling them to a desired location. The loading grapple 26 can also be rotated so that the felled trees in the loading grapple 26 can be brought to a suitable position when they are e.g. loaded into or unloaded from the load space 18. The crane 24 is selectively positioned by a drive system 28. The work vehicle 10 may further be considered to include a power train 30, a control system 32, and a hydraulic system 34. The work vehicle 10 includes the tandem wheel assembly 12 on the rear frame 16 for mounting two wheels 36, 38 on a left side of the work vehicle 10 and for mounting two wheels 40, 42 on a right side of the work vehicle 10, and further may have a like tandem wheel assembly on the front frame 20 for mounting two wheels on a left side of the work vehicle 10 and for mounting two wheels on a right side of the work vehicle 10. Each wheel 36, 38, 40, 42 is mounted on the tandem wheel assembly 12 by a wheel end hub 44. The wheels 36, 38, 40, 42 include a pair of left wheels defined by a first left wheel 36 and a second left wheel 38, and a pair of right wheels defined by a first right wheel 40 and a second right wheel 42 (also collectively referred to as "the four tandem wheels 36, 38, 40, 42"). It should be noted that any left/right wheel pairs may be arranged as dual wheels on each left/right lateral side of the work vehicle 10 (e.g., sides in the x-direction illustrated in FIG. 1).

Generally, the power train 30 includes a source of propulsion 46, such as an engine, which supplies power to the work vehicle 10, as either direct mechanical power or after being converted to electric power (e.g., via batteries) or hydraulic power. In one example, the engine may be an internal combustion engine, such as a diesel engine, that is controlled by an engine control module (not shown) of the control system 32. It should be noted that the use of an internal combustion engine is merely an example, as the source of propulsion 46 may be a fuel cell, an electric motor, a hybrid-gas electric motor, or other power-producing devices. A transmission 48 transmits power from the source of propulsion 46 to one or more of the wheels 36, 38, 40, 42. Additionally, the power train 30 has wheel steering components 50, including various devices (e.g., power steering pumps and lines, steering mechanisms, and the like) that couple manual (e.g., operator steering controls or wheel) and/or automated (via the control system 32) steering input to one or more of the sets of wheels.

In addition to providing tractive power to propel the work vehicle 10, the source of propulsion 46 may provide power to various onboard subsystems, including various electrical and hydraulic components of the work vehicle 10, and for off-boarding power to other sub-systems remote from the work vehicle 10. For example, the source of propulsion 46 may provide mechanical power that is converted to an electric format to run the electronics of the control system 32 and one or more electric drives of the work vehicle 10. The power train 30 thus may have mechanical to electrical power conversion components 52, one or more batteries 54, and associated electronics, including various alternators, generators, voltage regulators, rectifiers, inverters, and the like. The source of propulsion 46 may also provide mechanical power that is converted to hydraulic format to power various pumps and compressors that pressurize fluid to drive various actuators of the hydraulic system 34 in order to power wheel steering and braking and various work implements onboard the work vehicle 10. The hydraulic system 34 may include other components (e.g., valves, flow lines, pistons/cylinders, seals/gaskets, and so on), such that control of various devices may be effected with, and based upon, hydraulic, mechanical, or other signals and movements.

The control system 32 may be configured as a computing device with associated processor devices and memory architectures, as a hard-wired computing circuit (or circuits), as a programmable circuit, as a hydraulic, electrical, or electro-hydraulic controller. The control system 32 may be configured to execute various computational and control functionality with respect to the work vehicle 10, including various devices associated with the drive system 28, the power train 30, the hydraulic system 34, and various additional components of the work vehicle 10. In some embodiments, the control system 32 may be configured to receive input signals in various formats (e.g., as hydraulic signals, voltage signals, current signals, and so on), and to output command signals in various formats (e.g., as hydraulic signals, voltage signals, current signals, mechanical movements, and so on).

As noted above, the hydraulic system 34 may be controlled by the control system 32 (automatically, via operator input, or both). The hydraulic system 34 may be powered by the source of propulsion 46 and configured in various arrangements to serve a plurality of hydraulic functions (e.g., powering the drive system 28). Accordingly, the hydraulic system 34 may have components including a reservoir 56 for storing hydraulic fluid, a pump 58 for supplying pressurized hydraulic fluid from the reservoir 56, various valves (e.g., a control valve) and lines 60 associated with each function.

In the illustrated example, when the work vehicle 10 drives in the forward direction (indicated in FIG. 1), the tandem wheel assembly 12 follows behind the connection of the crane 24 and the rear frame 16 and supports most weight on the rear frame 16. The tandem wheel assembly 12 is pivotable about a pivot axis 62. In particular, each of the pair of the left wheels 36, 38 and the pair of right wheels 40, 42 can independently pivot relative to the work vehicle 10 about the pivot axis 62. During use, if the work vehicle 10 encounters an obstacle or an uneven surface, the tandem wheel assembly 12 accommodates this by pivoting relative to the chassis 14 of the work vehicle 10. Reaction assemblies 64, which form a walking beam configuration, counteract the forces that cause the tandem wheel assembly 12 to pivot to provide improved downforce distribution to each of the pair of the left wheels 36, 38 and the pair of right wheels 40, 42 during operation of the work vehicle 10, especially during acceleration and deceleration of the work vehicle 10. The reaction assemblies 64 respond to input torque changes with reactive forces or moments to maintain each of the pair of the left wheels 36, 38 and the pair of right wheels 40, 42 into engagement with the ground. A pivot dampening system 66 dampens pivoting of the tandem wheel assembly 12 when the work vehicle 10 traverses an incline/decline or encounters an obstacle in the roadway to further improve the tractive engagement of the wheels 36, 38, 40, 42 with the ground and the overall ride stability of the work vehicle 10.

The tandem wheel assembly 12 mounts the four tandem wheels 36, 38, 40, 42 below the rear frame 16. The example tandem wheel assembly 12, FIG. 2, may include a differential housing 68, first mounting arms 70, second mounting arms 72, first and second pivot cages 74, and first and second tandem wheel housings 76 to which the reaction assemblies 64 and the pivot dampening system 66 are respectively mounted. The pivot cages 74 are disposed about the pivot axis 62, rigidly fixed relative to the rear frame 16 and each functions, in part, as the central pivot about which the tandem wheel assembly 12, and the four tandem wheels 36, 38, 40, 42, pivot relative to the work vehicle 10. The pivot cages 74 form part of the chassis 14 and may be integrally formed with the rear frame 16, or may be separately formed and fixedly attached to the rear frame 16. The differential housing 68 is rigidly affixed to the first and second mounting arms 70, 72, which are fixed to the chassis 14 of the work vehicle 10 (e.g., via bolts through arm bores of the mounting arms 70, 72). Thus, the differential housing 68 and the pivot cages 74 are fixed in place relative to each other, and one or both of the first and second tandem wheel housings 76 pivot independently relative to the differential housing 68 and the respective first and second pivot cages 74.

Figure 3:
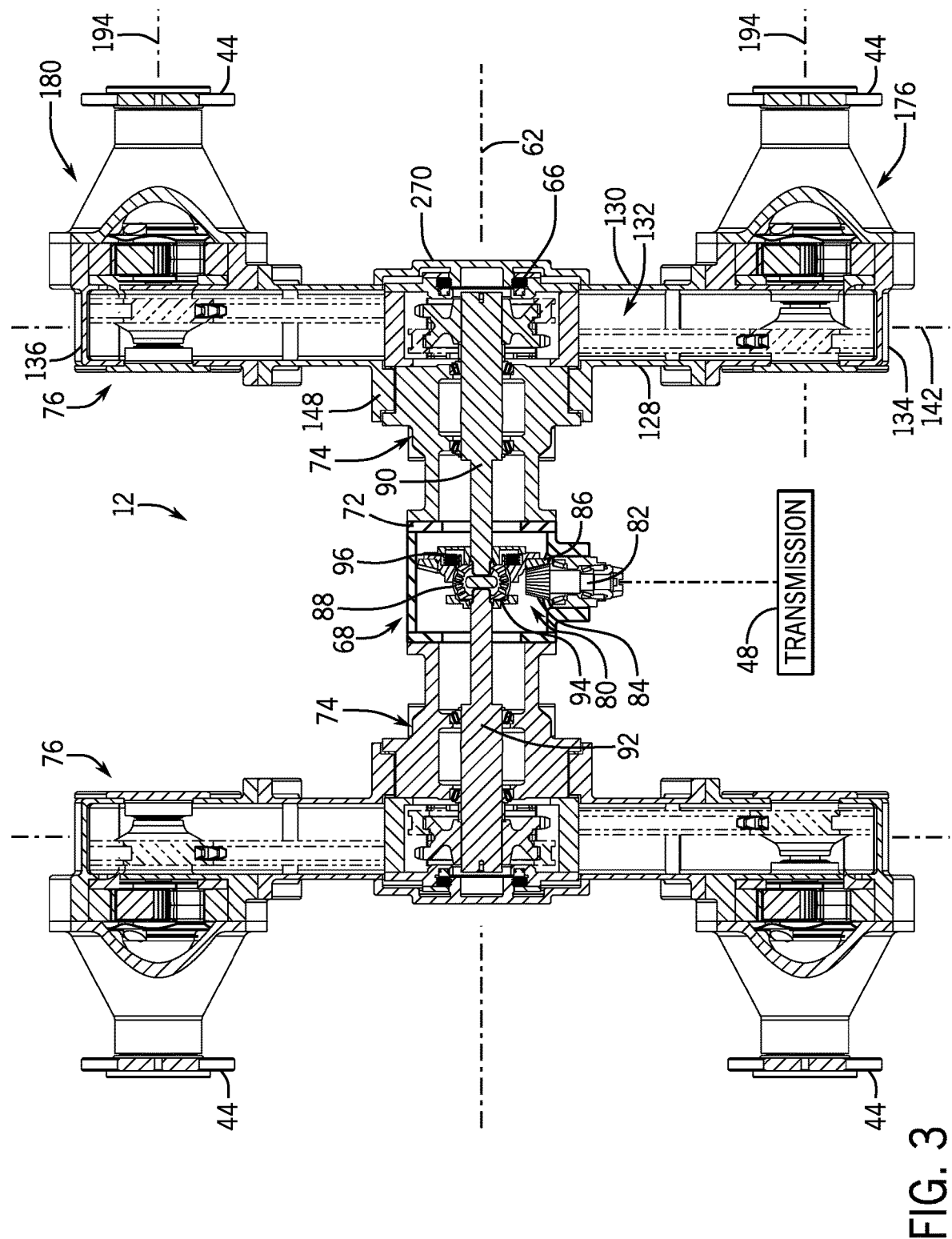
FIG. 3 is a top cross-sectional view of the example tandem wheel assembly through plane 3-3 of FIG. 2.

As also noted above, the tandem wheel assembly 12 includes components of the power train 30 to transmit motive power to each of the four wheels 36, 38, 40, 42, FIG. 3. A differential 80 is mounted in the differential housing 68 and connected to a driveshaft 82 that is driven by the transmission 48. The differential 80 includes gearing components to split and translate rotation of the driveshaft 82 laterally outboard toward the first and second tandem wheel housings 76. A pinion gear 84 at the end of the driveshaft 82 meshes with a differential ring gear 86 mounted with a differential case 88 that is coupled to a first shaft 90 and a second shaft 92 (via a side gear 94). The differential 80 may be a limited-slip differential with a clutch pack 96 for resisting slip. Although not illustrated in detail, the differential housing 68 may house additional components of the differential 80, including brakes, u-joint(s), ring gear, pinion shaft(s), pinion gear(s), planet gear(s), side gears, clutch plates, bearings, and the like. Any type of differential may be implemented within the tandem wheel assembly 12, including an open differential, limited slip differential, or the like. The differential housing 68 also mounts portions of the driveshaft 82 and portions of the first and second shafts 90, 92. A hydraulically applied brake 98 may be provided and engaged with the shafts 90, 92 as is known in the art.

Figure 6:
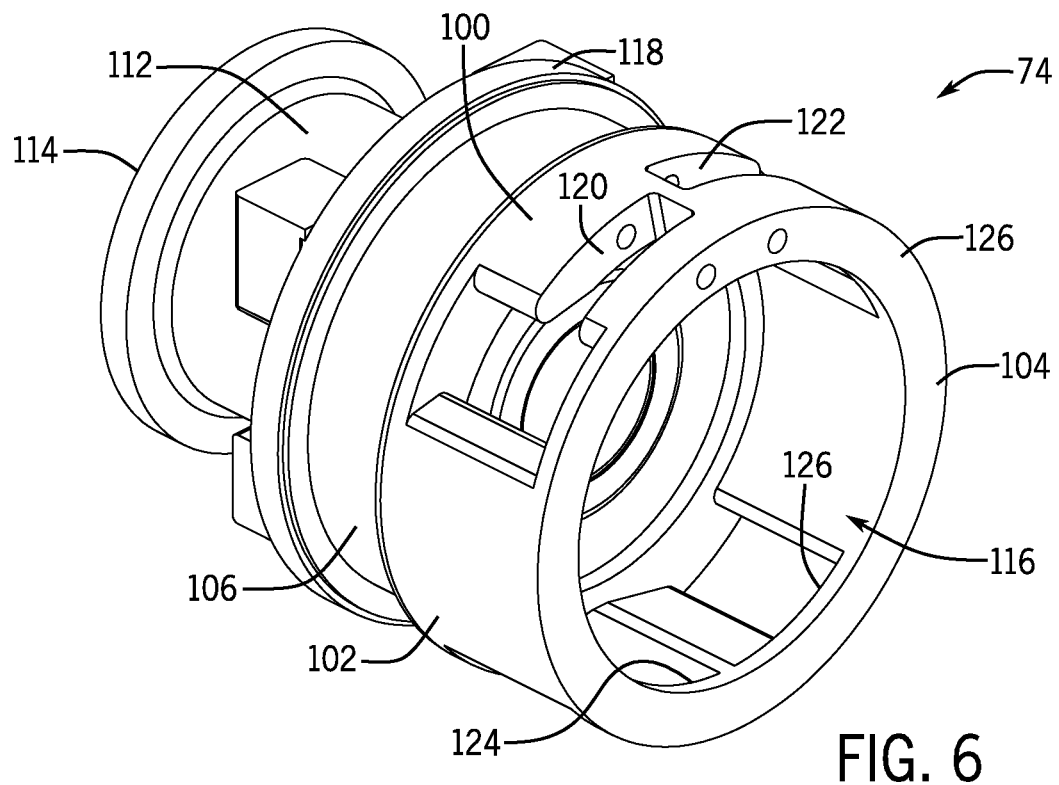
FIG. 6 is an isometric view of a pivot cage of the example tandem wheel assembly.
Figure 7:
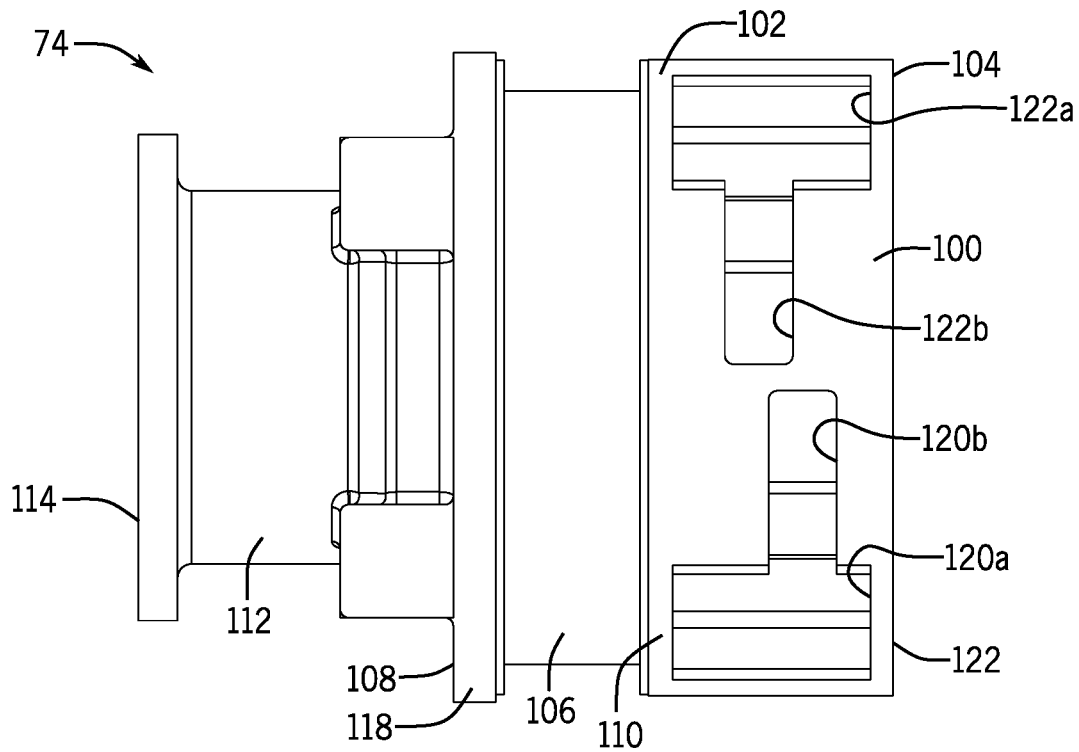
FIG. 7 is a top plan view of the pivot cage.
Figure 8:
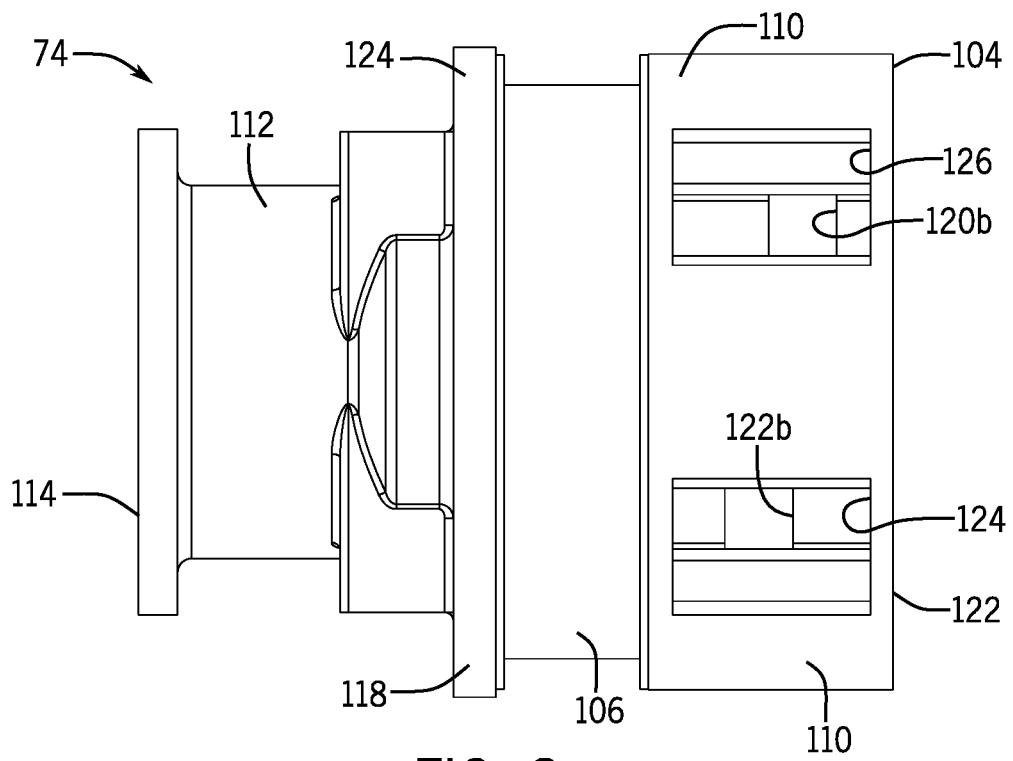
FIG. 8 is a bottom plan view of the pivot cage.

Referring also to FIGS. 6-8, each pivot cage 74 has an annular body 100 disposed about the pivot axis 62 and which extends between an inboard end 102 thereof and an outboard end 104 thereof. Each pivot cage 74 further has an annular bearing receiving body portion 106 which extends between an inboard end 108 thereof and an outboard end 110 thereof. The bearing receiving body portion 106 extends from the inboard end 102 of the annular body 100. Each pivot cage 74 further has a chassis coupling body portion 112 extending from the inboard end 108 of the bearing receiving body portion 106 and is coupled at its inboard end 114 to the chassis 14 and the differential housing 68. The bearing receiving body portion 106 has a diameter which is less than the diameter of the annular body 100. A cavity 116 extends from the inboard end 114 of the chassis coupling body portion 112 to the outboard end 104 of the annular body 100. An annular flange 118 extends radially outward from the bearing receiving body portion 106 at the inboard end 108. The flange 118 may have the same diameter as the annular body 100. At least one opening is provided through the annular body 100 between the ends 102, 104 and is in communication with the cavity 116. As shown, the at least one opening is provided by a forward upper opening 120, a rearward upper opening 122, a forward lower opening 124, a rearward lower opening 126. As shown, each upper opening 120, 122 is generally T-shaped, having a lower portion 120a, 122a that is wider than an upper portion 120b, 122b. The upper portions 120b, 122b are laterally offset from each other and the lower portions 120a, 122a are aligned with each other in a fore-aft direction. As shown, the upper portion 120b of forward upper opening 120 is outboard of the upper portion 122b of the rearward upper opening 122, however, the upper portion 120b of forward upper opening 120 may be inboard of the upper portion 122b of the rearward upper opening 122. This reduces the size of the pivot cage 74. In an embodiment, the upper portions 120b, 122b are aligned with each other in the fore-aft direction. The lower portion 120a is laterally aligned with the forward lower opening 124; the lower portion 122a is laterally aligned with the rearward lower opening 126. The lower openings 124, 126 are aligned with each other in a fore-aft direction. The first and second pivot cages 74 may be formed of cast metal or other suitable structural material.

Figure 2:
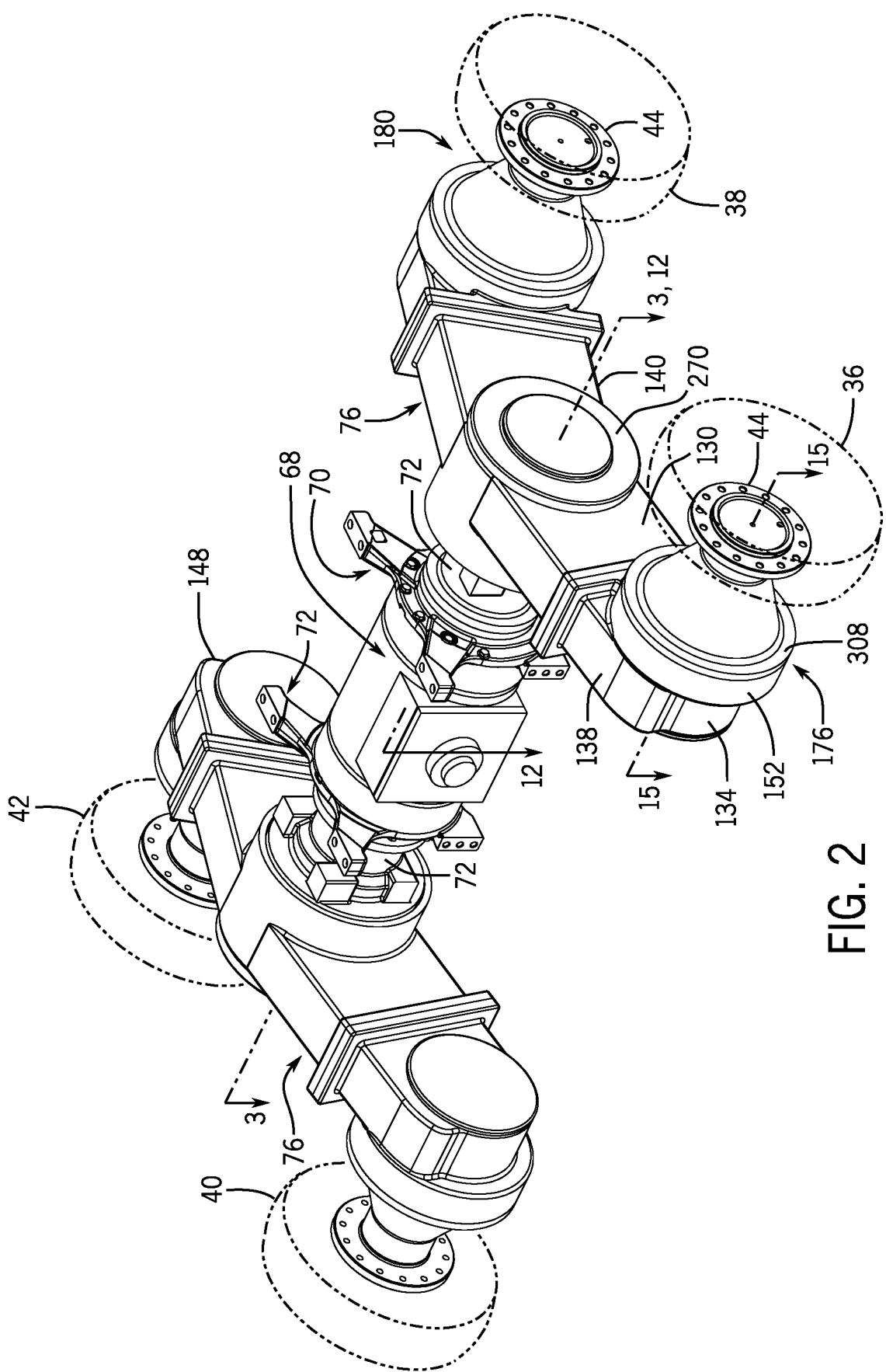
FIG. 2 is an isometric view of an example tandem wheel assembly for the example forwarder.
Figure 5:
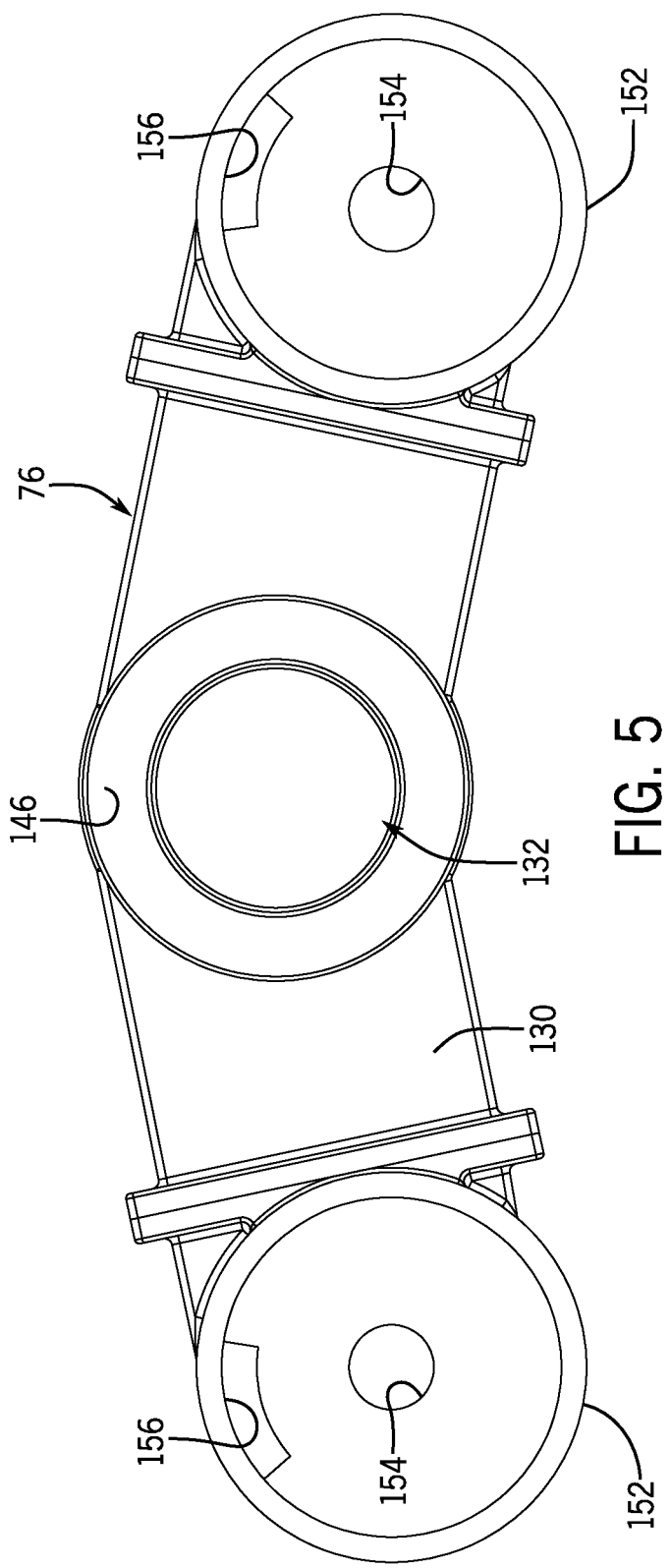
FIG. 5 is a side elevation view of a tandem wheel housing of the example tandem wheel assembly.

Each tandem wheel housing 76, FIGS. 2, 3 and 5, is a generally hollow part that has an inboard wall 128 and an outboard wall 130 defining an internal volume 132 that extends from a front wall 134 to a rear wall 136 and extends between an upper wall 138 and a lower wall 140. A longitudinal axis 142 of the tandem wheel housing 76 is defined between the front wall 134 and the rear wall 136 and is perpendicular to the pivot axis 62. The inboard wall 128 defines a center opening 144 about the pivot axis 62 which communicates with the internal volume 132, and the outboard wall 130 defines a center opening 146 about the pivot axis 62 which communicates with the internal volume 132 and is aligned with the center opening 144. A cylindrical projection 148 extends from the inboard wall 128 and defines a center passageway 150 about the pivot axis 62 which extends from the opening 144 and communicates with the internal volume 132. The center passageway 150 defines an inner diameter which is less than the inner diameter defined by the center openings 144, 146 such that the projection 148 forms an outboard shoulder. The annular body 100 of the respective pivot cage 74 nests or seats within the center openings 144, 146 and is proximate to the shoulder formed by the outboard end of the annular projection 152 so that the tandem wheel housing 76 can pivot around the pivot cage 74 and relative to the chassis 14. A cylindrical projection 152 extends from the outboard wall 130 proximate to the front wall 134 and proximate to the rear wall 136. A wheel end opening 154 is provided through the outboard wall 130 at the center of each cylindrical projection 152 which communicates with the internal volume 132. An arcuate-shaped opening 156 is provided through the outboard wall 130 and is proximate to the internal wall formed by each projection 152. The opening 156 is spaced from the wheel end opening 154 and is spaced vertically above the wheel end opening 154. Each tandem wheel housing 76 may be formed of cast metal or other suitable structural material. Each tandem wheel housing 76 may be made in a modular form; as shown each tandem wheel housing 76 has three parts which are affixed together.

Figure 10:
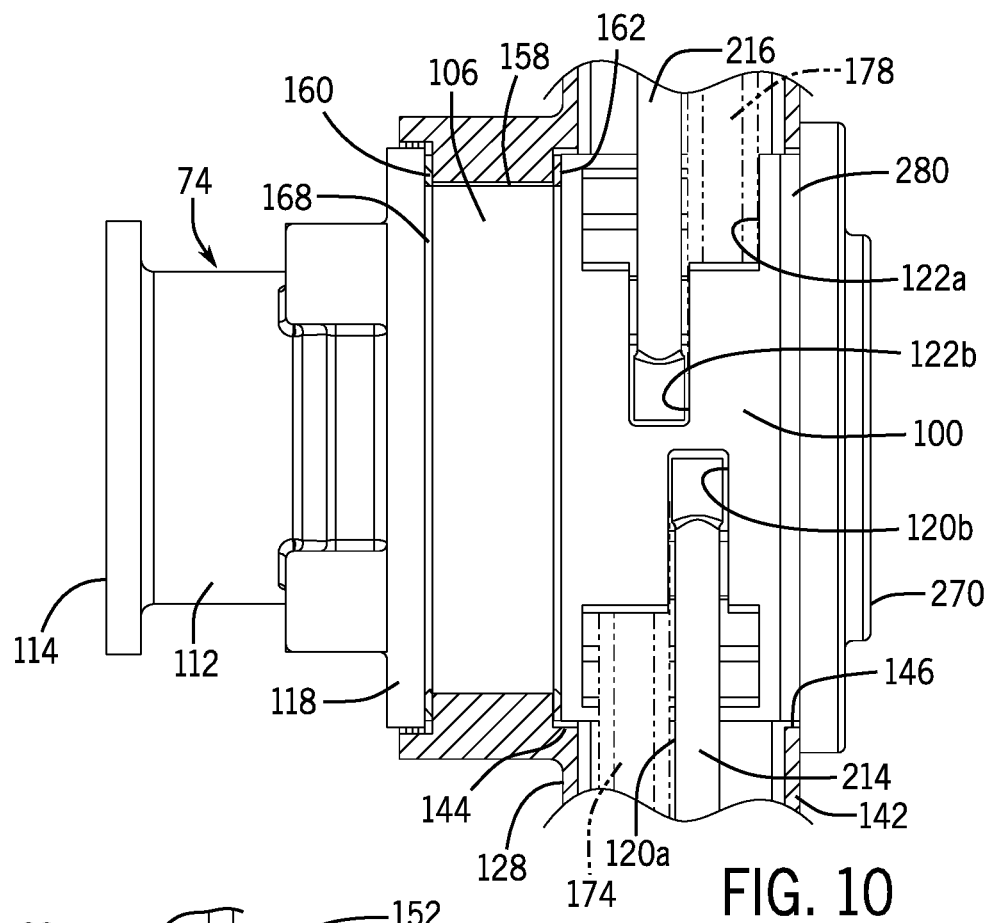
FIG. 10 is a partial top elevation view of the tandem wheel assembly, with the tandem wheel housing shown broken away.
Figure 12:
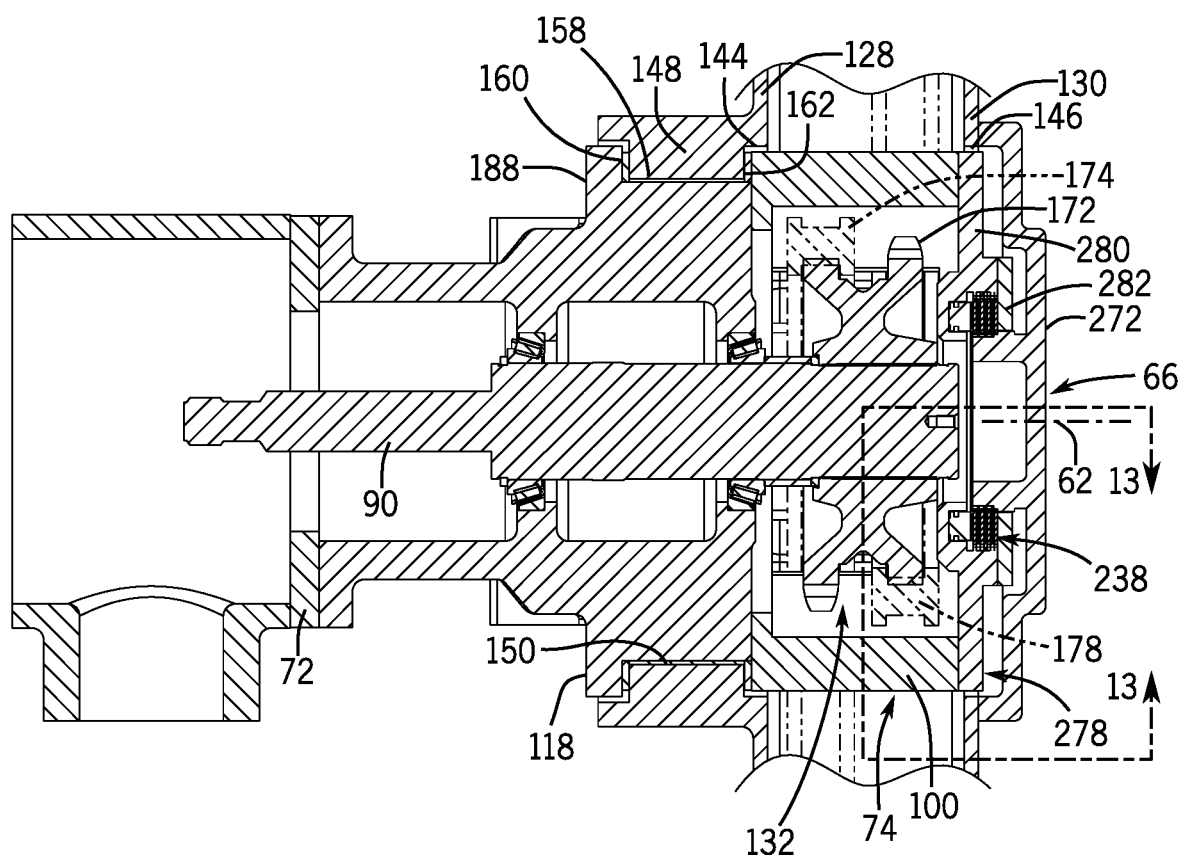
FIG. 12 is a cross-sectional view of the example tandem wheel assembly according to an embodiment, showing area 12-12 of FIG. 2.

A circular bushing 158 and a pair of circular inboard and outboard thrust bearings 160, 162, FIGS. 10 and 12, are provided between the pivot cage 74 and the tandem wheel housing 76 to promote pivoting of the tandem wheel housing 76 relative to the pivot cage 74. The bushing 158 is disposed between an inner surface of the annular projection 148 and an outer surface of the bearing receiving body portion 106 outboard of the flange 118. The inboard thrust bearing 160 is disposed between an outboard surface of the flange 118 and an inboard surface of the bearing receiving body portion 106. The outboard thrust bearing 162 is disposed between the inboard end 102 of the annular body 100 and the outboard end 110 of the bearing receiving body portion 106.

The components in each tandem wheel housing 76 may be identical, mirror images. Each tandem wheel housing 76 has a center sprocket 172 mounted for co-rotation with the respective shafts 90, 92, a first chain 174 connecting the center sprocket 172 to a front wheel end assembly 176 on a first side of the center sprocket 172, and a second chain 178 connecting the center sprocket 172 to a rear wheel end assembly 180 on a second side of the center sprocket 172, FIG. 12. In some embodiments, the center sprocket 172 is a dual-ring sprocket that mounts the first chain 174 extending to the front wheel end assembly 176 and the second chain 178 extending to the rear wheel end assembly 180. The center sprocket 172 is positioned laterally outboard of the bushing 158.

Figure 13:
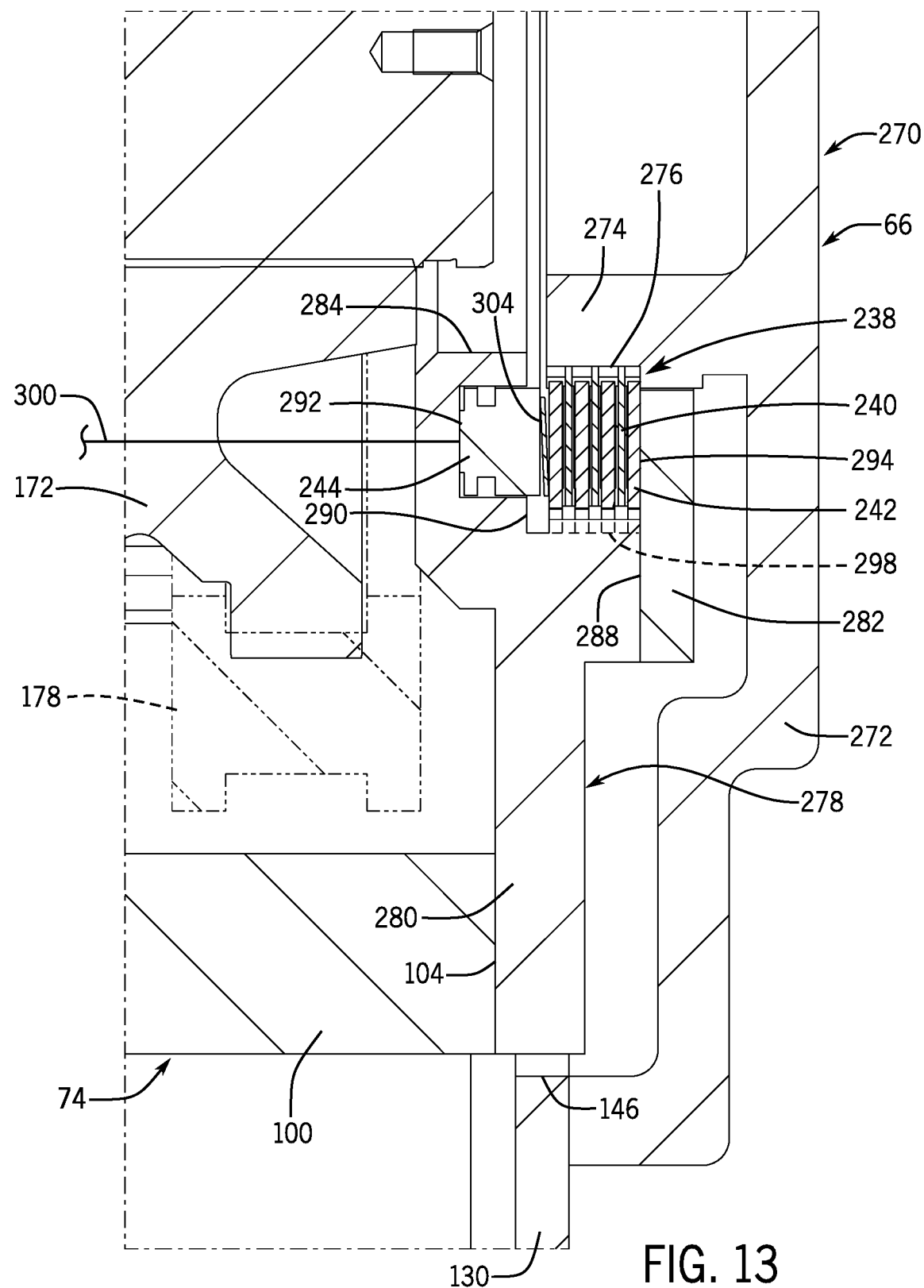
FIG. 13 is an enlargement of area 13-13 of FIG. 12.

Each wheel end assembly 176, 180, FIG. 13, includes a wheel end sprocket 182 mounted on a shaft 184 for co-rotation therewith, a wheel end gear train 188 coupled to the shaft 184, a wheel end housing 190, and a wheel end hub 44. The wheel end housing 190 of the front wheel end assembly 176 is fixedly mounted on the outboard wall 130 of the tandem wheel housing 76 within the cylindrical projection 152, and the wheel end housing 190 of the rear wheel end assembly 180 is fixedly mounted on the outboard wall 130 of the tandem wheel housing 76 within the cylindrical projection 152. The shaft 184 of each wheel end assembly 176, 180 is rotationally mounted to the inboard wall 128, extends through the respective wheel end opening 154 in the outboard wall 130 and extends laterally outboard from the outboard wall 130. The shaft 184 of each wheel end assembly 176, 180 extends laterally outward of the outboard wall 130 and is coupled to the wheel end gear train 188. A wheel end axis 194 is defined by the shaft 184 and is parallel to the pivot axis 62.

The wheel end sprocket 182 of the front wheel end assembly 176 is aligned with one of the dual rings of the center sprocket 172 and connected thereby by the first chain 174. The first chain 174 passes through the lower portion 120a of the forward upper opening 120 in the pivot cage 74, around the center sprocket 172, through the forward lower opening 124 in the pivot cage 74, and around the wheel end sprocket 182 of the front wheel end assembly 176. The wheel end sprocket 182 of the rear wheel end assembly 180 is aligned with the other of the dual rings of the center sprocket 172 and connected thereby by the second chain 178. The second chain 178 passes through the lower portion 122a of the rearward upper opening 122 in the pivot cage 74, around the center sprocket 172, through the rearward lower opening 126 in the pivot cage 74, and around the wheel end sprocket 182 of the rear wheel end assembly 180. Although the first chain 174 is illustrated as mounted inboard relative to the second chain 178, these relative positions may be reversed. The wheel end sprockets 182 will have an equal size (e.g., equal number of teeth) to drive the corresponding first and second left wheels 36, 38 (or the first and second right wheel 40, 42) at a substantially equal speed. The first and second chains 174, 178 may be leaf chains, roller chains, or other suitable drive chains for heavy construction applications. The chains 174, 178 may be continuous chains without a disassembling or "master" link to improve the torque-handling capabilities of the chains 174, 178. In some embodiments, the openings 120, 124 are continuous, and the openings 122, 126 are continuous. In some embodiments, the openings 120, 122 are continuous, and the openings 124, 126 are continuous. In some embodiments, all of the openings 120, 124, 122, 126 are continuous.

The wheel end gear train 188 includes a ring gear 196, and a planetary gear seat 198 coupled to the ring gear 196. A shaft 200 of the wheel end hub 44 extends through a wheel end opening 202 in the wheel end housing 190 and is coupled to the planetary gear seat 198. The shaft 200 supports the wheel end hub 44 of the respective wheel 36, 38, 40, 42 for co-rotation therewith around the wheel end axis 194. The wheel end gear train 188 is mounted within the wheel end housing 190 and effects a gear ratio change to rotate the associated wheel end hub 44 and its shaft 200 about the associated wheel end axis 194. The ring gear 196 is rotatable relative to the wheel end housing 190 as described herein. Other configurations of the wheel end gear train 188 may be incorporated without departing from the scope of the present disclosure.

Each wheel end housing 190 extends laterally outboard from the outboard wall 130 and has the wheel end opening 202 at the end thereof that supports at least a portion of the wheel end hub 44. The wheel end housing 190 may be cone shaped. The shaft 200 of the wheel end hub 44 extends through the wheel end housing 190 and the wheel end opening 202, and the shaft 200 and its wheel end hub 44 are supported in the wheel end housing 190 by rotational bearings 204. The wheel end housing 190 may mount various additional supporting components (not shown) such as roller bearings.

The wheel end shaft 184 of the front wheel end assembly 176 defines a front wheel end axis 194 that is a rotation axis of the front wheel end hub 44 and the wheel 36 (or wheel 42 on the right side of the work vehicle 10), the front wheel end shaft 184 and the front wheel end sprocket 182 when driven by the center sprocket 172 via the first chain 174. This front wheel end axis 194 is substantially parallel to the pivot axis 62. The wheel end shaft 184 of the rear wheel end assembly 180 defines a rear wheel end axis 194 that is a rotation axis of the rear wheel end hub 44 and the wheel 38 (or wheel 44 on the right side of the work vehicle 10), the rear wheel end shaft 184 and the rear wheel end sprocket 182 when driven by the center sprocket 172 via the second chain 178. This rear wheel end axis 194 is substantially parallel to the pivot axis 62. Accordingly, when the center sprocket 172 rotates, the chains 174, 178 provide co-rotation of the wheel end sprockets 182 of the wheel end assemblies 176, 180, and rotation of the wheels 36, 38, 40, 42.

Figure 4:
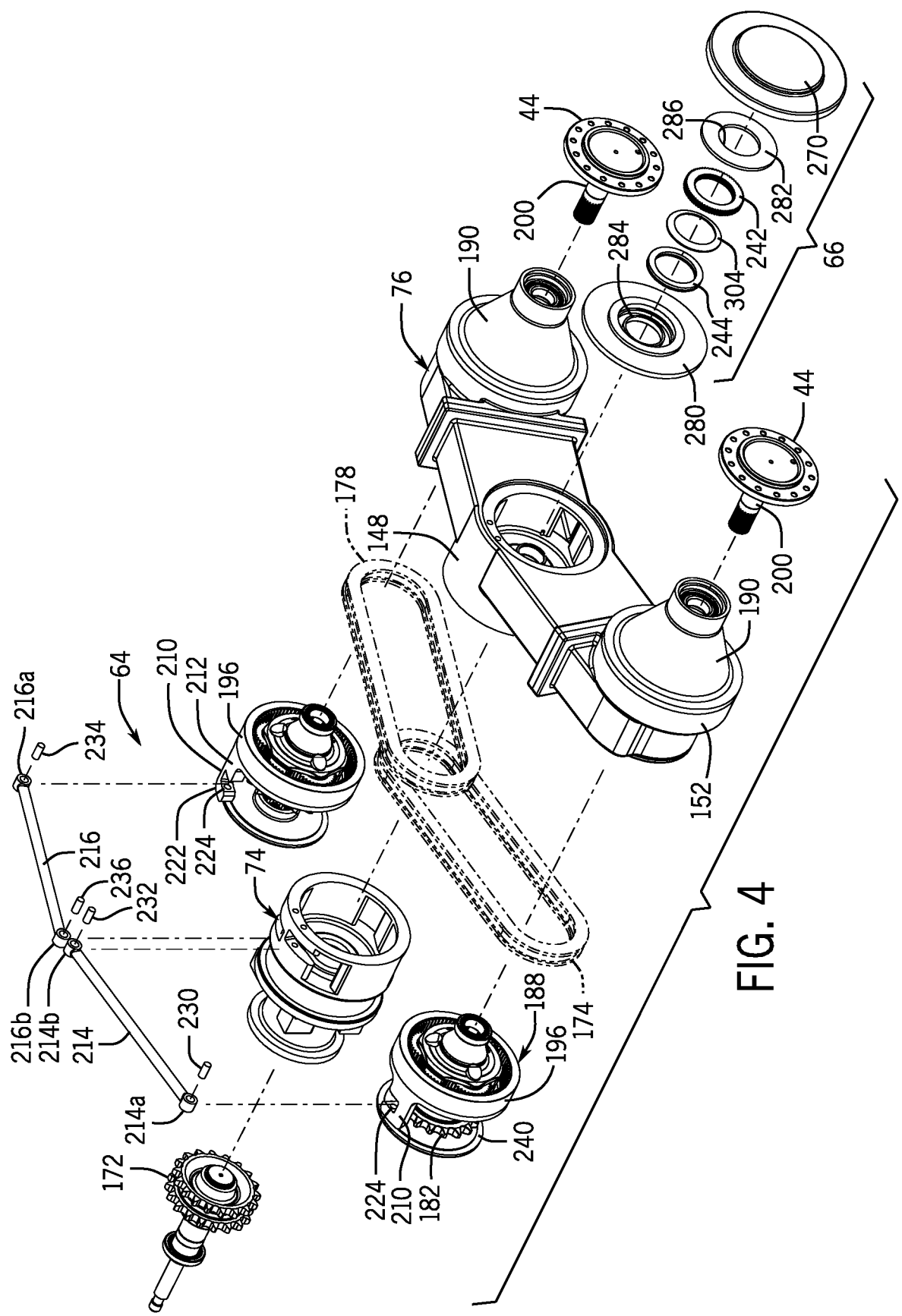
FIG. 4 is an exploded, isometric view of the example tandem wheel assembly according to an embodiment.

Each reaction assembly 64, FIG. 4, includes the pivot cage 74, a front reaction bar support 210 attached to an inboard end of the ring gear 196 of the wheel end gear train 188 of the front wheel end assembly 176 for co-rotation therewith, a rear reaction bar support 212 attached to an inboard end of the ring gear 196 of the wheel end gear train 188 of the rear wheel end assembly 180 for co-rotation therewith, a front reaction bar 214 coupled between the front reaction bar support 210 and the pivot cage 74, and a rear reaction bar 216 coupled between the rear reaction bar support 212 and the pivot cage 74.

Figure 9:
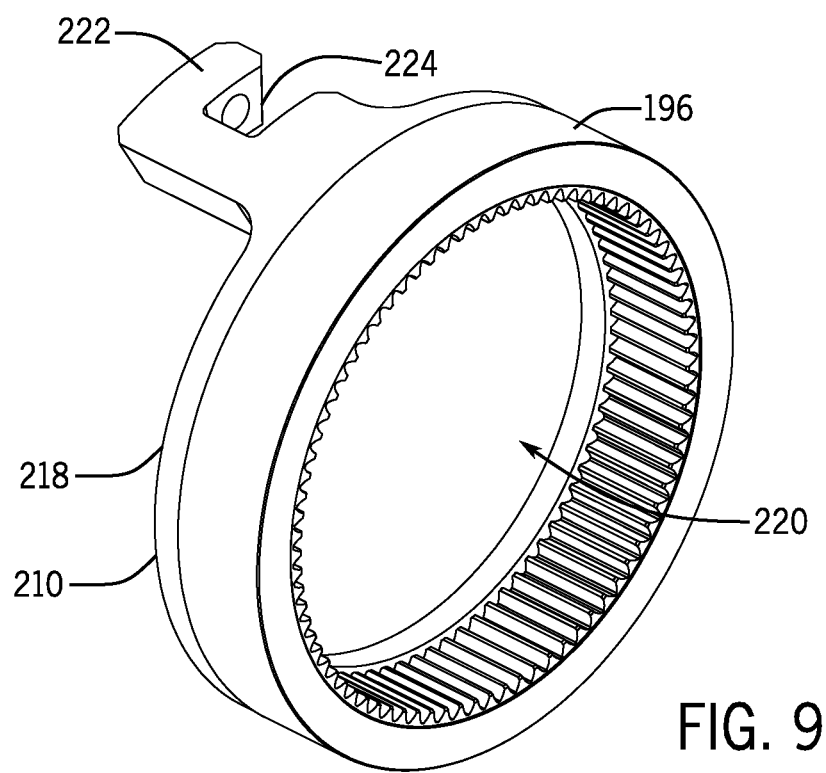
FIG. 9 is an isometric view of a reaction bar support of the example tandem wheel assembly.

Each reaction bar support 210, 212, FIG. 9, includes an annular body portion 218 having a central aperture 220 therethrough which is slightly larger than the aperture through the ring gear 196. An outboard end of the annular body portion 218 is attached to the inboard end of the ring gear 196 for co-rotation therewith. An attachment portion 222 extends from an inboard end of the body portion 218 and has a recess 224 therein. The recess 224 of the front reaction bar support 210 faces rearwardly and the recess 224 of the rear reaction bar support 212 faces forwardly. Each recess 224 may be generally square shaped. The attachment portions 222 of the reaction bar supports 210, 212 extend through respective arcuate-shaped receiving openings 226, 228 in the outboard wall 130 of the tandem wheel housing 76, FIG. 5, which are proximate to the wheel end openings 154 at the opposite ends of the tandem wheel housing 76. The receiving openings 226 are spaced vertically above the respective wheel end openings 154. Each receiving opening 226, 228 has a length in a fore-aft direction which is greater than a length of the attachment portion 222. The receiving openings 226, 228 provide for communication of the internal volume of the wheel end housing 190 with the internal volume 132 of the tandem wheel housing 76.

Figure 11:
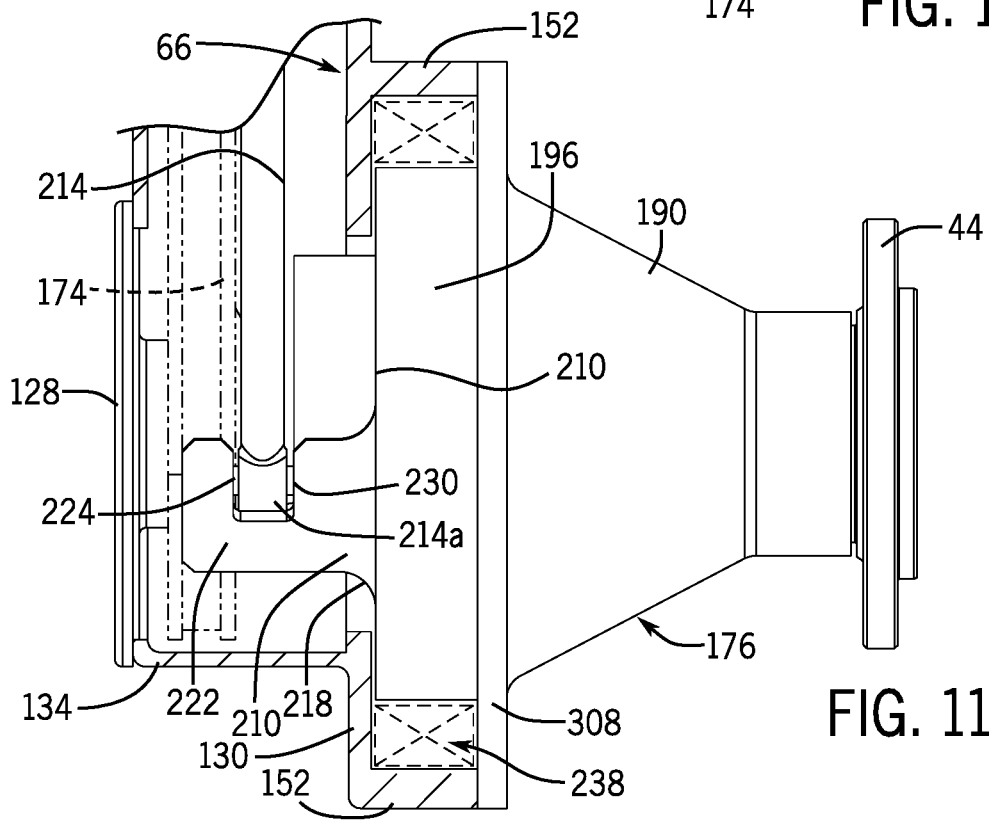
FIG. 11 is a partial top elevation view of the example tandem wheel assembly, with the tandem wheel housing shown broken away and a clutch assembly shown schematically in cross-section.

Each reaction bar 214, 216, FIG. 4, is an elongate and rigid member. The front reaction bar 214 includes a front end 214*a* that seats in the recess 224 of the front reaction bar support 210, FIG. 11, and is pivotally coupled to the attachment portion 222 of the front reaction bar support 210 by a pivot pin 230 that extends through the front end 214*a* and seats within apertures in the walls forming the recess 224 of the reaction bar support 210, and includes a rear end 214*b* that seats in the forward upper opening 120 of the pivot cage 74 and is pivotally coupled to the annular body 100 of the pivot cage 74 by a pivot pin 232 that extends through the rear end 214*b* and seats within apertures in the walls forming the upper portion 120*b* of the forward upper opening 120, FIG. 10. The front reaction bar 214 is laterally offset from the chain 174, and as shown is laterally inboard of the chain 174. The front reaction bar 214 can pivot relative to the pivot cage 74 and relative to the front reaction bar support 210. The rear reaction bar 216 includes a rear end 216*a* that seats in the recess 224 of the rear reaction bar support 212 and is pivotally coupled to the attachment portion 222 of the reaction bar support 212 by a pivot pin 234 that extends through the rear end 216*a* and seats within apertures in the walls forming the recess 224 of the rear reaction bar support 212, and includes a front end 216*b* that seats in the rearward upper opening 122 of the pivot cage 74 and is pivotally coupled to the annular body 100 of the pivot cage 74 by a pivot pin 236 that extends through the front end 216*b* and seats within apertures in the walls forming the upper portion 122*b* of the rearward upper opening 122. The reaction bar 216 is laterally offset from the chain 178, and as shown is laterally outboard of the chain 178. The rear reaction bar 216 can pivot relative to the pivot cage 74 and relative to the rear reaction bar support 212. The front and rear reaction bars 214, 216 can pivot relative to each other. The reaction bars 214, 216 seat within the internal volumes 132 the tandem wheel housings 76. This provides for a significantly compact design compared to prior art designs which had the reactions bars exposed. In addition, the provision of the reaction bars 214, 216 within the internal volume 132 prevent a moving part from being exposed to outside elements that could damage the reaction bars 214, 216.

Figure 16:
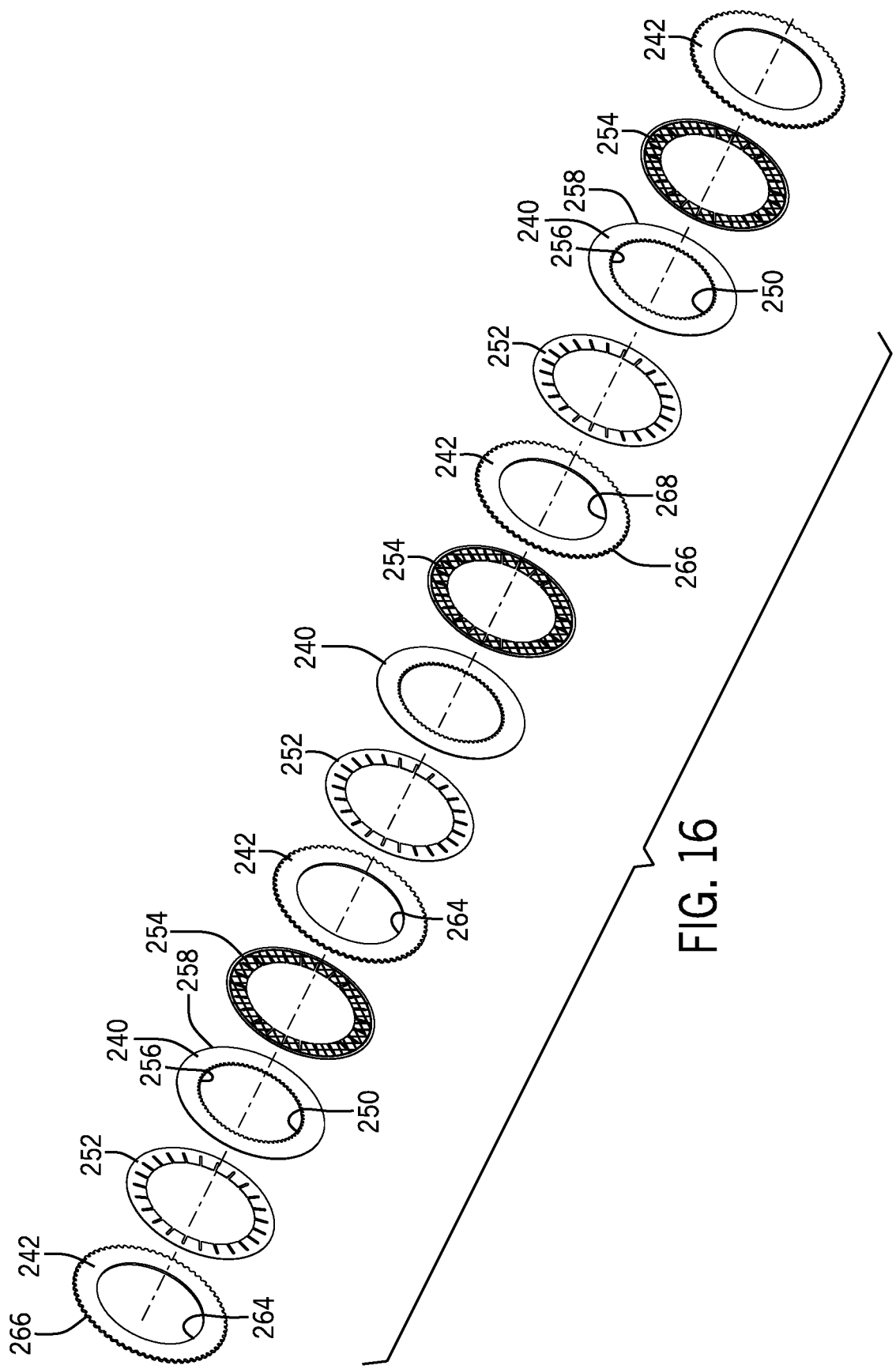
FIG. 16 is an isometric, exploded view of discs of a clutch assembly of the example tandem wheel assembly.
Figure 17:
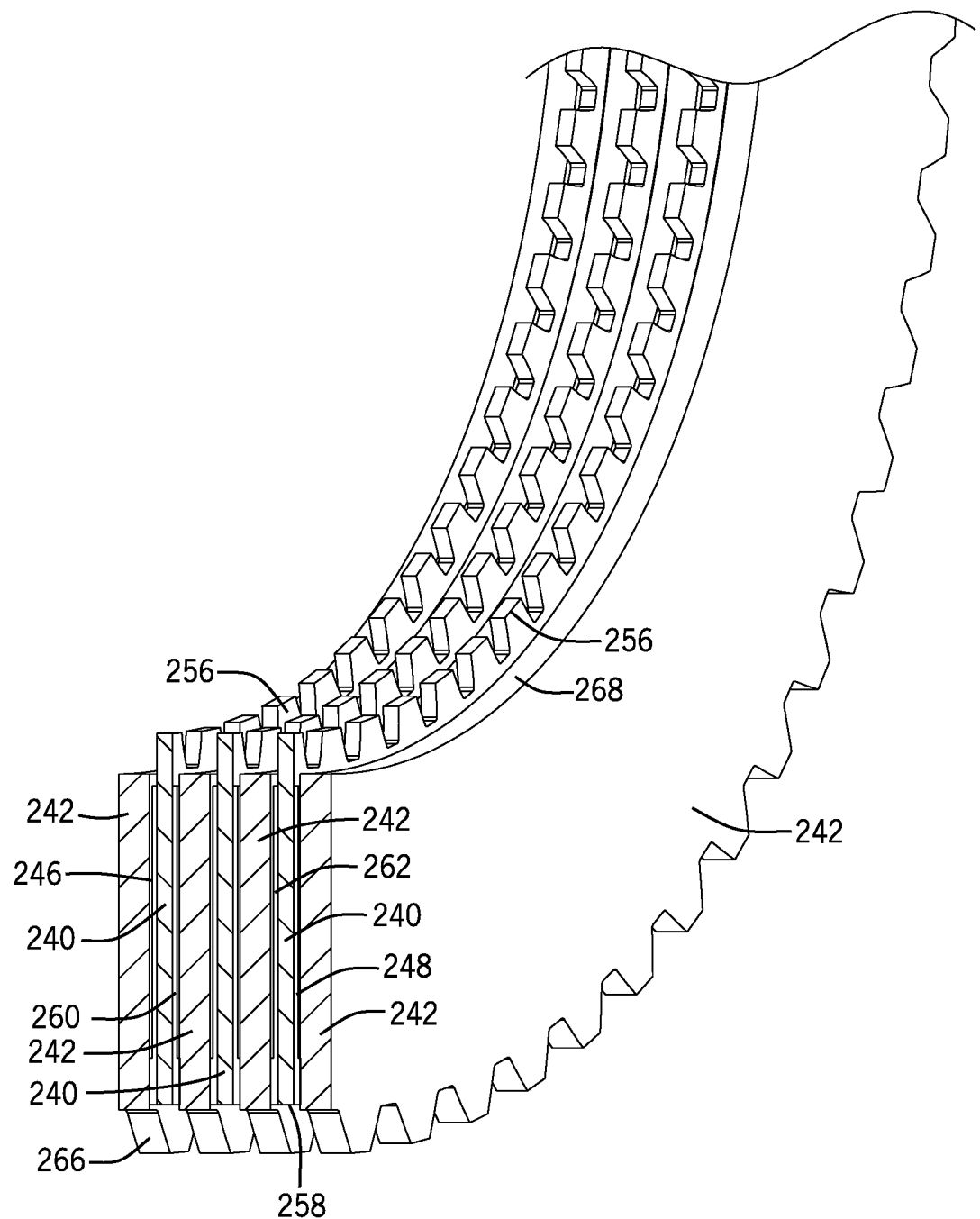
FIG. 17 is a partial isometric view, shown in cross-section of the discs.

The pivot dampening system 66 dampens the pivoting of the tandem wheel assembly 12 to further improve the tractive engagement of the wheels 36, 38, 40, 42 with the ground and the overall ride stability of the work vehicle 10. The pivot dampening system 66 operates to impart a pivot-retarding, and in some cases braking or locking, force to the tandem wheel assembly 12, and thereby to the wheels 36, 38, 40, 42, to better distribute the downforce applied by the reaction assembly 64. The pivot dampening system 66 may serve to inhibit, slow or prevent the pivoting of the tandem wheel assembly 12 from such events as acceleration changes, riding over obstacles, or riding on inclines/declines, thereby affecting the amount by which the tandem wheel assembly 12 pivot initially in response to such events, if at all. In a first embodiment, the pivot dampening system 66 includes a single, central clutch assembly 238 disposed between the tandem wheel housing 76 and the pivot cage 74. In a second embodiment, the pivot dampening system 66 includes a clutch assembly 238 disposed between the tandem wheel housing 76 and at least one of the wheel end assemblies 176, 180. In the second embodiment, each wheel end assembly 176, 180 may have an associated clutch assembly 238 (and the clutch assembly 238 at the pivot cage 74 is not provided; likewise the clutch assembly 238 at the at least one wheel end assembly 176, 180 is not provided when the clutch assembly 238 is provided at the pivot cage 74). Each clutch assembly 238 includes a plurality of interleaved friction discs 240 and backing discs 242, see FIGS. 16 and 17, some of which are rotationally fixed to the tandem wheel housing 76 and some of which are rotationally fixed to either the pivot cage 74 or the wheel end assembly 176, 180, and an actuator 244.

The friction discs 240 are circular with inboard and outboard surfaces 246, 248 and a central opening 250. A friction material 252 is provided on the inboard surface 246, and a friction material 254 is provided on the outboard surface 248 (the friction materials 252, 254 are shown exploded from the friction discs 240 in FIG. 16 for illustration purposes). The friction materials 252, 254 may have a roughened surface, raised surfaces, and like thereon. A plurality of spaced apart teeth 256 are provided on the interior diameter of each friction disc 240 defined by the opening 250 and an exterior surface 258 defined by the outer diameter of each friction disc 240 is smooth. The backing discs 242 are circular with planar inboard and outboard surfaces 260, 262 and a central opening 264. A plurality of spaced apart teeth 266 are provided on the exterior of each friction disc 240 and an inner surface 268 defined by the opening 264 of each backing disc 242 is smooth. When positioned between in the tandem wheel assembly 12, friction discs 240 are between two adjacent backing discs 242. The teeth 256 of the friction discs 240 extend inwardly of the inner surfaces 268 of the backing discs 242, and the teeth 266 of the backing discs 242 extend outwardly of the exterior surfaces 258 of the friction discs 240.

In the first embodiment as shown in FIGS. 4 and 12-14, the outboard wall 130 includes a cover 270 which seats over the center opening 146. The clutch assembly 238 is positioned between the cover 270 and the pivot cage 74. The cover 270 has an outer wall 272 that is fixed to the outboard wall 130 of the tandem wheel housing 76 and an inner cylindrical projection 274 that extends inward from the outer wall 320. An axis defined through the center of the projection 274 aligns with the pivot axis 62. The projection 274 has a plurality of spaced apart channels 276 which mirror the shape of the teeth 256 on the friction discs 240. The channels 276 extend along an axis parallel to the pivot axis 62. The pivot cage 74 further includes a clutch housing 278 at the outboard end 104 of the annular body 100. In an embodiment, the clutch housing 278 includes a retaining plate 280 and a backing plate 282 which are fixedly mated together. The retaining plate 280 is annular and has a center opening 284. The backing plate 282 is annular and has a center opening 286. The retaining plate 280 is at the outboard end 104 of the annular body 100 and the backing plate 282 is at the outboard end 288 of the retaining plate 280. The mated retaining plate 280 and backing plate 282 form an open ended recess 290 in which the discs 240, 242 and the actuator 244 are seated. The recess 290 has an inboard wall 292 formed by the retaining plate 280, an outboard wall 294 formed by the backing plate 282, and an outer wall 296 formed by the retaining plate 280 and which extends in a direction parallel to the pivot axis 62 between the inboard and outboard walls 292, 294; the recess 290 is open to the center opening 284 of the retaining plate 280. The outer wall 296 of the recess 290 has a plurality of spaced apart channels 298 formed therein which mirror the shape of the teeth 266 on the backing discs 242. The channels 298 extend along an axis parallel to the pivot axis 62. The discs 240, 242 surround the projection 274 of the cover, and the teeth 256 on the friction discs 240 seat within the channels 276 in the projection 274 and the teeth 266 seat with the channels 298 in the retaining plate 280. The discs 240, 242 extend through the open end of the recess 290. The engagement of the teeth 256 in the channels 276 provide for the sliding movement of the friction discs 240 relative to the projection 274 while preventing rotational movement relative thereto, and the engagement of the teeth 266 in the channels 298 provide for the sliding movement of the backing discs 242 relative to the retaining plate 280 and the backing plate 282 while preventing rotational movement relative thereto.

Figure 18:
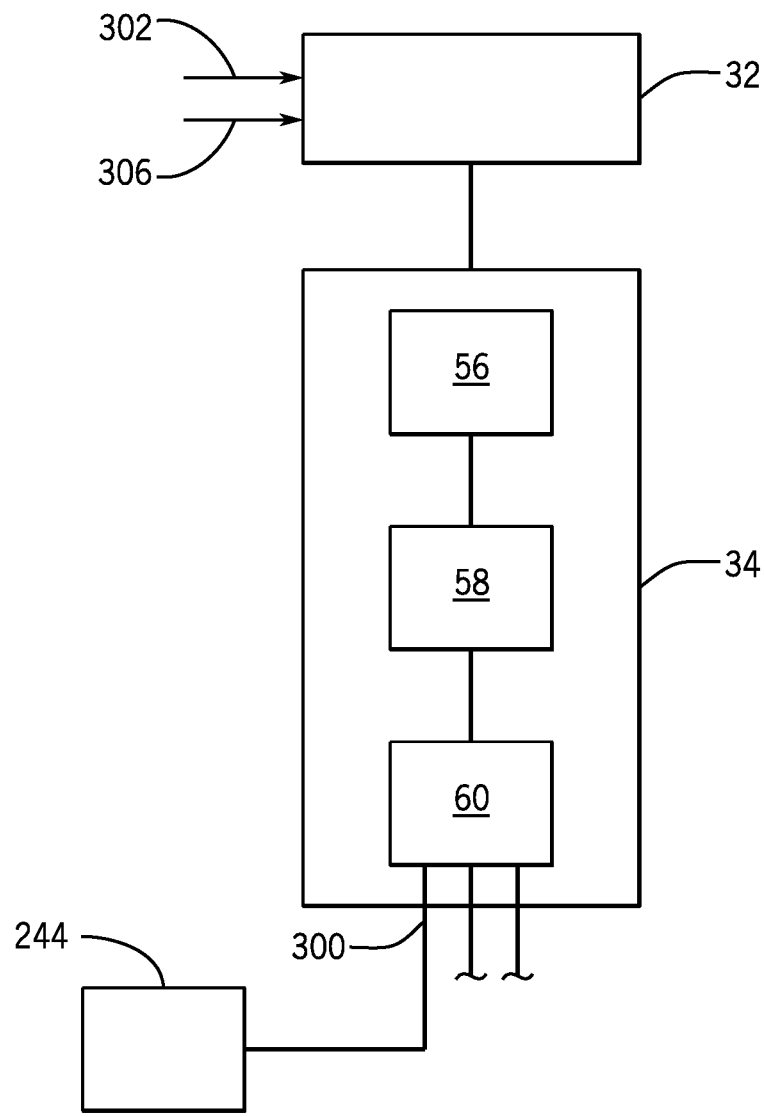
FIG. 18 is a schematic of a sample control and hydraulic system.

In some embodiments, the actuator 244 provides for an actively controlled system which allows for the active control of the pivot dampening system 66. As shown in FIGS. 12 and 13, the actuator 244 is a hydraulic piston within the recess 290 that engages with the inboard backing disc 242. The hydraulic piston is hydraulically connected to the hydraulic system 34 by a hydraulic line 300 so that the hydraulic piston is controlled by the control system 32. When the hydraulic piston is actuated under action of the hydraulic system 34 under control by the control system 32, the discs 240, 242 are pushed into engagement with each other. Because of the friction material 252, 254, this slows the pivoting of the tandem wheel housing 76 (via the cover 270) relative to the pivot cage 74 (via the clutch housing 278), and thus dampens the pivoting of the reaction bars 212, 214. The hydraulic piston may always be engaged with the inboard backing disc 242 to provide a load on the discs 240, 242, thereby reducing the amount of stroke that the hydraulic piston must travel to actuate the pivot dampening system 66, and to provide a constant dampening. In some embodiments, the control system 32 responds to an input 302 that indicates that a pivoting of the tandem wheel housing 76 is likely to occur or is occurring and activates the hydraulic system 34 to engage the hydraulic piston against the discs 240, 242. Such an input 302 may be, but is not limited to, a visual system which detects obstacles, a rotational sensor which indicates that a pivoting of the tandem wheel housing 76 has started to occur, an engine sensor, a transmission sensor or any other sensor or system which directly or indirectly provides an indication that the tandem wheel housing 76 is pivoting around the pivot cage 74. When the input 302 indicates that the pivoting of the tandem wheel housing 76 has likely stopped or has stopped, the control system 32 commands the hydraulic system 34 to release hydraulic pressure on the hydraulic piston so that the hydraulic piston relieves or removes pressure on the discs 240, 242. The return of the hydraulic piston may be effected by a spring 304 which may be between the hydraulic piston and the inboard backing disc 242 or may be internal within the hydraulic line piston. In some embodiments, the control system 32 responds to an input 306 by the operator. As schematically shown in FIG. 18, the control system 32 may be configured to command the hydraulic system 34 automatically under control algorithms depending upon the input 302, or responsive to the input 306 from the operator, to activate the hydraulic piston to apply a set pressure or varying amounts of pressure to be applied to the discs 240, 242 in opposition to the downforce of the reaction assembly 64 to achieve a desired balance between tractive and ride stability aspects of the work vehicle 10. To dampen the pivoting of the tandem wheel housing 76 to return the wheels in contact with the ground rapidly, a great amount of pressure can be applied by the hydraulic piston on the discs 240, 242. Likewise, to dampen the pivoting of the tandem wheel housing 76 slowly, a lesser amount of pressure can be applied by the hydraulic piston on the discs 240, 242. Thus, with the pivot dampening system 66 the tandem wheel assembly 12 may be sufficiently responsive to maintain or quickly return all of the wheels 36, 38, 40, 42 in contact with the ground to provide good tractive control of the work vehicle 10, while simultaneously avoiding excessively abrupt reactive downforces to further improve tractive engagement of the wheels 36, 38, 40, 42 and to enhance the ride quality for the operator of the work vehicle 10. The control system 32 may be configured to command the hydraulic system 34 to activate the hydraulic piston to apply a sufficient amount of pressure on the discs 240, 242 to lock or substantially lock the tandem wheel housing 76 in place which prevents or substantially prevents the relative movement of the tandem wheel housing 76 and the pivot cage 74. The active pivot dampening system 66 thus allows both the ability to select when and to what degree the dampening force is applied and also additional control settings to allow the tandem wheel assembly 12 to pivot freely (i.e., zero dampening) or to be locked against pivoting (i.e., fully dampened).

Figure 14:
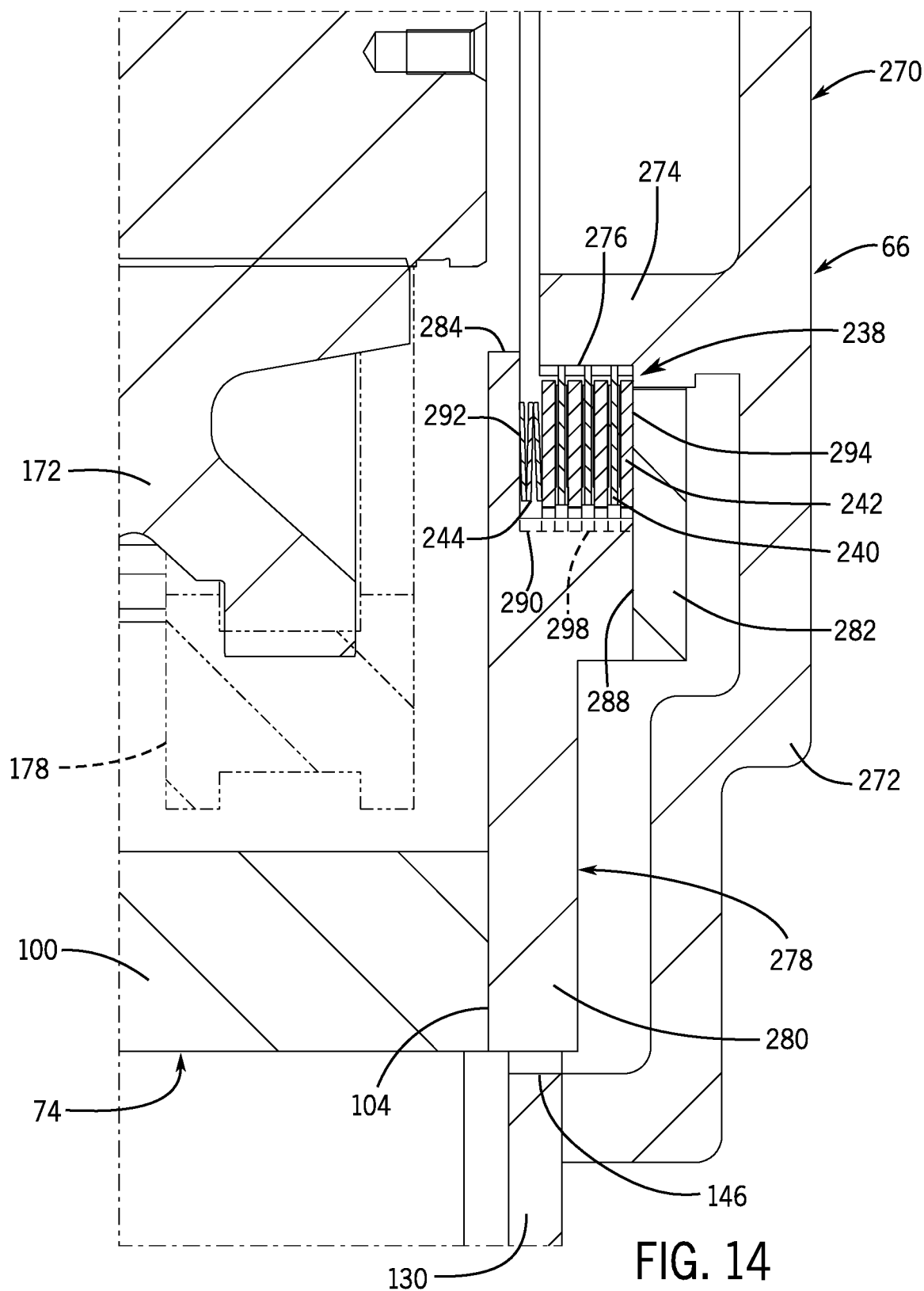
FIG. 14 is similar to the area shown in FIG. 13, but in accordance with another embodiment.
Figure 15:
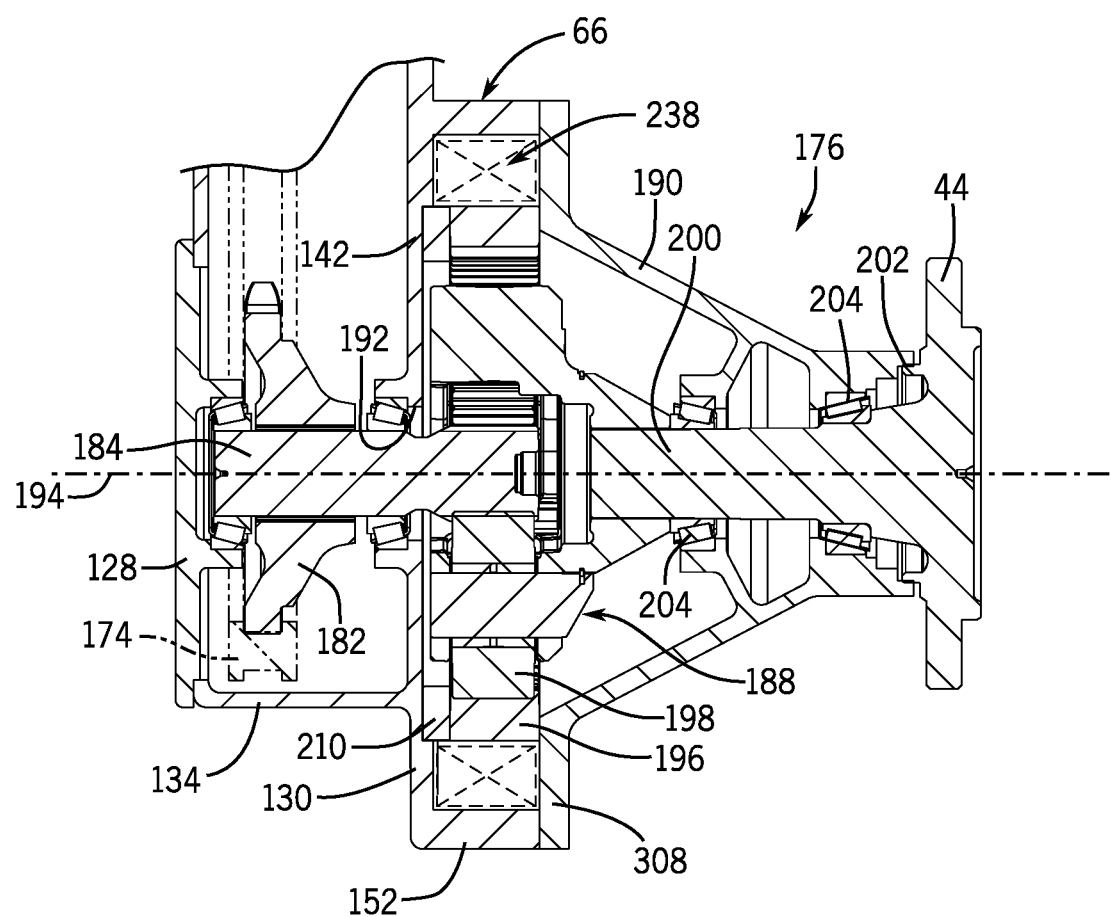
FIG. 15 is a cross-sectional view of the example tandem wheel assembly showing areas 15-15 of FIG. 2.

In some embodiments, the actuator 244 provides for a passive system as shown in FIG. 14. The actuator 244 is a spring or plurality of springs, such as a Belleville spring, within the recess 290 that engages with the inboard backing disc 242. In an embodiment, the springs always push the discs 240, 242 into engagement with each other, thereby applying a constant biasing force to the discs 240, 242 which resists pivoting of the tandem wheel assembly 12 in either clock direction. The friction material 252, 254 therefore always slows the pivoting of the tandem wheel housing 76 relative to the pivot cage 74 while still allowing the tandem wheel assembly 12 to pivot in either clock direction. [0064] In the second embodiment as shown in FIG. 15, the clutch assembly 238 at the pivot cage 74 is not provided except that the cover 270 is provided to close the center opening 146. In the second embodiment, the clutch assembly 238 is positioned between the tandem wheel housing 76 and at least one of the wheel end assemblies 176, 180. As shown, the clutch assembly 238 is positioned between the interior surface of the cylindrical projection 152 of the tandem wheel housing 76 and the exterior surface of the ring gear 196. The projection 152 has the plurality of spaced apart channels 276 on its interior surface which mirror the shape of the teeth 266 on the backing discs 242 and which extend along an axis parallel to the wheel axis 194. The outer wall 130 acts as the retaining plate 280 of the first embodiment, and a mounting flange 308 of the wheel end housing 190 which attaches the wheel end housing 190 to the outboard end of the projection 152 acts as the backing plate 282 of the first embodiment. The mated projection 152 and the wheel end housing 190 form the open ended recess 290 in which the discs 240, 242 and the actuator 244 are seated. The recess 290 has an inboard wall 292 formed by the outer wall 130, an outboard wall 294 formed by the mounting flange 308, and an outer wall 296 formed by the projection 152 and which extends in a direction parallel to the pivot axis 62 between the inboard and outboard walls 292, 294; the recess 290 is open to the center opening formed by the projection 152. The outer wall 296 of the recess 290 has the plurality of spaced apart channels 298 which mirror the shape of the teeth 266 on the backing discs 242. The channels 298 extend along an axis parallel to the wheel axis 194. The discs 240, 242 surround the ring gear 196, and the teeth 256 on the friction discs 240 seat within the channels 276 in the ring gear 196 and the teeth 266 seat with the channels 298 in the projection 152. The engagement of the teeth 256 in the channels 276 provide for the sliding movement of the friction discs 240 relative to the ring gear 196 while preventing rotational movement relative thereto, and the engagement of the teeth 266 in the channels 298 provide for the sliding movement of the backing discs 242 relative to the projection 152 while preventing rotational movement relative thereto. Like that of the first embodiment, the actuator 244 may be an actively controlled system which allows for the active control of the pivot dampening system 66 or may be a passive system (the passive system is shown in FIG. 15, but the active system can be provided). The specifics of the systems are not repeated herein. With the second embodiment, the rotation of the tandem wheel housing 76 is dampened relative to the pivot cage 74 via the connection between the ring gear 196, the reaction bar support 210 and/or 212, the reaction bar 214 and/or 216 and the pivot cage 74.

To propel the work vehicle 10, the source of propulsion 46 provides power to the transmission 48 that drives the differential 80 and the shaft 90, which, in turn, drives the center sprocket 172 in each tandem wheel housing 76. The center sprocket 172 drives the first and second chains 174, 178, which respectively rotate the first and second wheel end sprockets 182 and its shafts 200 to ultimately turn the pair of right wheels 36, 38 mounted on the wheel end assemblies 176, 180 (or to ultimately turn the pair of left wheels 36, 38 mounted on the wheel end assemblies 176, 180 in the left tandem wheel housing 76). The transmission 48 generally includes one or more gear arrangements and/or clutches (not shown) to modify the speed of the input from the source of propulsion 46 into one or more speeds suitable for the tandem wheel assembly 12. The rotation of the shaft 200 of the front wheel end assembly 176 rotates the wheel end gear train 188, including rotation of the ring gear 196 and the front reaction bar support 210 relative to the wheel end housing 190. The amount of rotation of the ring gear 196 and the front reaction bar support 210 is limited by the length of the receiving opening 226. Likewise, the rotation of the shaft 200 of the rear wheel end assembly 180 rotates the wheel end gear train 188, including rotation of the ring gear 196 and the rear reaction bar support 212 relative to the wheel end housing 190. The amount of rotation of the ring gear 196 and the rear reaction bar support 212 is limited by the length of the receiving opening 228.

In some scenarios, an increase of power from the source of propulsion 46 may tend to pivot the tandem wheel assembly 12 about the pivot axis 62, lifting the front wheel 36 or 42 from the ground while increasing the downward pressure on the rear wheel 38 or 44. To counteract this tendency, the reaction bars 214, 216 provide an opposing force, transferring torque directly to the chassis 14. Also, a sudden decrease in power from the source of propulsion 46 may reverse the direction of pivoting of the reaction assembly 64 about the pivot axis 62; however, these forces may be counteracted by the reaction bars 214, 216. Accordingly, pivoting of the reaction assembly 64 relative to the chassis 14 may be limited, and torque delivered to the wheels 36, 38 or 40, 42 may be substantially equal. The pivot dampening system 66 dampens the pivoting of the reaction assembly 64 such that ride quality is improved When the work vehicle 10 traverses over an obstacle in the roadway, the front wheel 36 and/or 40 rises up and the tandem wheel housing 76 pivots clockwise relative to the pivot cage 74. After the front wheel 36 and/or 40 passes the obstacle, the pivot dampening system 66 prevents the tandem wheel housing 76 from pivoting counter-clockwise relative to the pivot cage 74 by dampening the pivoting of the tandem wheel housing 76 relative to the pivot cage 74. As the work vehicle 10 continues to travers over the obstacle, the rear wheel 38 and/or 42 rises up and the tandem wheel housing 76 pivots counter-clockwise relative to the pivot cage 74. After the rear wheel 38 and/or 42 passes the obstacle, the pivot dampening system 66 deters the tandem wheel housing 76 from pivoting clockwise relative to the pivot cage 74 by dampening the pivoting of the tandem wheel housing 76 relative to the pivot cage 74. This improves the ride quality.

The foregoing describes one or more example tandem wheel assemblies in detail. Various other configurations are possible within the scope of this disclosure. For example, the disclosed dual ring two chain drive in the tandem wheel housing may be replaced with a single ring center sprocket and a single chain coupling the center sprocket to both wheel end sprockets.

ENUMERATED EXAMPLES

Also, the following examples are provided, which are numbered for easier reference.

1. A tandem wheel assembly for a work vehicle having a chassis and wheels, the tandem wheel assembly including: a tandem wheel housing defining a center opening extending along a pivot axis and wheel end openings extending along associated wheel end axes, the tandem wheel housing being pivotally mounted to the chassis about the pivot axis; a center sprocket disposed within the tandem wheel housing and rotatable with respect to the tandem wheel housing; wheel end assemblies each disposed at one of the wheel end openings, each wheel end assembly having a wheel end sprocket, a wheel end gear train, and a wheel end hub, each wheel end sprocket being supported within the tandem wheel housing for rotation by at least one chain coupled to the center sprocket, each wheel end gear train being coupled for rotation by the associated wheel end sprocket and configured to effect a gear ratio change and rotate the associated wheel end hub about the associated wheel end axis; a pair of reaction bars, each being pivotally coupled at a first end to the chassis and at an opposite second end to a component of the respective wheel end assembly; and a pivot dampening system at least in part positioned axially between the tandem wheel housing and either the chassis or the component of at least one of wheel end assemblies, the pivot dampening system configured to dampen the pivoting of the tandem wheel housing relative to the chassis.

2. The tandem wheel assembly of example 1, wherein the pivot dampening system comprises a clutch assembly having a plurality of discs some of which are rotationally fixed to the tandem wheel housing and some of which are rotationally fixed to either the chassis or the component.

3. The tandem wheel assembly of example 2, further including an actuator that causes the discs to engage or disengage.

4. The tandem wheel assembly of example 3, wherein the actuator is a hydraulically driven piston.

5. The tandem wheel assembly of example 4, further including a spring coupled to the discs and configured to either engage or disengage the discs.

6. The tandem wheel assembly of example 4, wherein activation of the hydraulically driven piston is controlled by a controller, the controller is configured to control hydraulic pressure to the hydraulically driven piston.

7. The tandem wheel assembly of example 2, further including an actuator comprising a spring configured to apply a bias force to engage the discs.

8. The tandem wheel assembly of example 2, wherein each wheel end gear train is a planetary gear set having a ring gear; and wherein the ring gear is the component of each wheel end assembly to which the second ends of the reaction bars are coupled.

9. The tandem wheel assembly of example 8, wherein the ring gear of each wheel end gear train is positioned within the respective wheel end hub and has an attachment portion which extends into an interior of the tandem wheel housing.

10. The tandem wheel assembly of example 9, wherein the second end of each reaction bar is pivotally coupled to the respective attachment portion by a pin.

11. The tandem wheel assembly of example 2, further including a pivot cage disposed about the pivot axis of the tandem wheel housing, the pivot cage being fixedly mounted to the chassis; and wherein the first end of each reaction bar pivotally couples to the pivot cage at a location spaced from the pivot axis.

12. The tandem wheel assembly of example 11, wherein the pivot cage extends into the tandem wheel housing and the reaction bars extend between the pivot cage and the wheel end assemblies within the tandem wheel housing.

13. The tandem wheel assembly of example 11, wherein the pivot dampening system includes a clutch assembly having a clutch housing fixedly attached to an outboard end of the pivot cage, the clutch housing defining a recess in which the clutch assembly is positioned; and wherein the clutch assembly includes a plurality of discs engaging with the clutch housing.

14. The tandem wheel assembly of example 13, further including a cover fixedly attached to an outboard wall of the tandem wheel housing; and wherein the cover has a cylindrical projection extending into the clutch housing, the discs engaging with the cylindrical projection.

15. A tandem wheel assembly for a work vehicle having a chassis and wheels, the tandem wheel assembly including: a tandem wheel housing defining a center opening extending along a pivot axis and wheel end openings extending along associated wheel end axes; a pivot cage disposed within the center opening to allow the tandem wheel housing to pivot about the pivot axis, the pivot cage being fixedly mounted to the chassis; a center sprocket disposed within the pivot cage and rotatable with respect to the tandem wheel housing; wheel end assemblies each disposed at one of the wheel end openings, each wheel end assembly having a wheel end sprocket, a wheel end gear train, and a wheel end hub, each wheel end sprocket being supported within the tandem wheel housing for rotation by at least one chain coupled to the center sprocket, each wheel end gear train being coupled for rotation by the associated wheel end sprocket and configured to effect a gear ratio change and rotate the associated wheel end hub about the associated wheel end axis; a pair of reaction bars, each being pivotally coupled at a first end to the pivot cage and at an opposite second end to a component of the wheel end assembly; and a pivot dampening system configured to dampen the pivoting of the tandem wheel housing relative to the chassis, the pivot dampening system including a clutch assembly at least in part positioned axially between the tandem wheel housing and either the chassis or the component of at least one of wheel end assemblies, the clutch assembly having: a plurality of discs some of which are rotationally fixed to the tandem wheel housing and some of which are rotationally fixed to the chassis; and an actuator that causes the discs to engage or disengage.

CONCLUSION

The examples discussed above result in a variety of benefits of the disclosed tandem wheel assembly. For example, the reaction bars are pivotally coupled at one end to the annular body of the pivot cage and at an opposite end to a component of the wheel end gear train to provide for the transfer and distribution of forces between the wheels as the work vehicle travels and the pivot dampening system dampens pivoting of the tandem wheel assembly when the work vehicle traverses an incline/decline or encounters an obstacle in the roadway to further improve the tractive engagement of the wheels with the ground and the overall ride stability of the work vehicle. An active or a passive pivot dampening system is provided. The active pivot dampening system may allow for enhanced control options and selective application of the pivot dampening to provide for the ability to select when and to what degree the dampening force is applied and also additional control settings to allow the tandem wheel assembly to pivot freely (i.e., zero dampening) or to be locked against pivoting (i.e., fully dampened). The passive pivot dampening system may allow for dampening in a continuous manner and a mechanically and electronically less complex application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A tandem wheel assembly for a work vehicle having a chassis and wheels, the tandem wheel assembly comprising:
    a tandem wheel housing defining a center opening extending along a pivot axis and wheel end openings extending along associated wheel end axes, the tandem wheel housing being pivotally mounted to the chassis about the pivot axis;
    a center sprocket disposed within the tandem wheel housing and rotatable with respect to the tandem wheel housing;
    wheel end assemblies each disposed at one of the wheel end openings, each wheel end assembly having a wheel end sprocket, a wheel end gear train, and a wheel end hub, each wheel end sprocket being supported for rotation by at least one chain coupled to the center sprocket, each wheel end gear train being coupled for rotation by the associated wheel end sprocket and configured to effect a gear ratio change and rotate the associated wheel end hub about the associated wheel end axis;
    a pair of reaction bars, each being pivotally coupled at a first end to the chassis and at an opposite second end to a component of the respective wheel end assembly; and
    a pivot dampening system at least in part positioned axially between the tandem wheel housing and either the chassis or the component of at least one of the wheel end assemblies, the pivot dampening system configured to dampen the pivoting of the tandem wheel housing relative to the chassis, wherein the pivot dampening system comprises a clutch assembly having a plurality of discs.

2. The tandem wheel assembly of claim 1, wherein some of the plurality of discs are rotationally fixed to the tandem wheel housing and some of of the plurality of discs are rotationally fixed to either the chassis or the component.

3. The tandem wheel assembly of claim 2, further including an actuator that causes the discs to engage or disengage.

4. The tandem wheel assembly of claim 3, wherein the actuator is a hydraulically driven piston.

5. The tandem wheel assembly of claim 4, further including a spring coupled to the discs and configured to either engage or disengage the discs.

6. The tandem wheel assembly of claim 4, wherein activation of the hydraulically driven piston is controlled by a controller, the controller is configured to control hydraulic pressure to the hydraulically driven piston.

7. The tandem wheel assembly of claim 2, further including an actuator comprising a spring configured to apply a bias force to engage the discs.

8. The tandem wheel assembly of claim 2, wherein each wheel end gear train is a planetary gear set having a ring gear; and
wherein the ring gear is the component of each wheel end assembly to which the second ends of the reaction bars are coupled.

9. The tandem wheel assembly of claim 8, wherein the ring gear of each wheel end gear train is positioned within the respective wheel end hub and has an attachment portion which extends into an interior of the tandem wheel housing.

10. The tandem wheel assembly of claim 9, wherein the second end of each reaction bar is pivotally coupled to the respective attachment portion by a pin.

11. The tandem wheel assembly of claim 2, further including a pivot cage disposed about the pivot axis of the tandem wheel housing, the pivot cage being fixedly mounted to the chassis; and
wherein the first end of each reaction bar pivotally couples to the pivot cage at a location spaced from the pivot axis.

12. The tandem wheel assembly of claim 11, wherein the pivot cage extends into the tandem wheel housing and the reaction bars extend between the pivot cage and the wheel end assemblies within the tandem wheel housing.

13. The tandem wheel assembly of claim 11, wherein the pivot dampening system includes a clutch assembly having a clutch housing fixedly attached to an outboard end of the pivot cage, the clutch housing defining a recess in which the clutch assembly is positioned; and
wherein the clutch assembly includes a plurality of discs engaging with the clutch housing.

14. The tandem wheel assembly of claim 13, further including a cover fixedly attached to an outboard wall of the tandem wheel housing; and
wherein the cover has a cylindrical projection extending into the clutch housing, the discs engaging with the cylindrical projection.

15. A tandem wheel assembly for a work vehicle having a chassis and wheels, the tandem wheel assembly comprising:
a tandem wheel housing defining a center opening extending along a pivot axis and wheel end openings extending along associated wheel end axes;
a pivot cage disposed within the center opening to allow the tandem wheel housing to pivot about the pivot axis, the pivot cage being fixedly mounted to the chassis;
a center sprocket disposed within the pivot cage and rotatable with respect to the tandem wheel housing;
wheel end assemblies each disposed at one of the wheel end openings, each wheel end assembly having a wheel end sprocket, a wheel end gear train, and a wheel end hub, each wheel end sprocket being supported within the tandem wheel housing for rotation by at least one chain coupled to the center sprocket, each wheel end gear train being coupled for rotation by the associated wheel end sprocket and configured to effect a gear ratio change and rotate the associated wheel end hub about the associated wheel end axis;
a pair of reaction bars, each being pivotally coupled at a first end to the pivot cage and at an opposite second end to a component of the wheel end assembly; and
a pivot dampening system configured to dampen the pivoting of the tandem wheel housing relative to the chassis, the pivot dampening system including a clutch assembly at least in part positioned axially between the tandem wheel housing and either the chassis or the component of at least one of wheel end assemblies, the clutch assembly having:
a plurality of discs some of which are rotationally fixed to the tandem wheel housing and some of which are rotationally fixed to the chassis; and
an actuator that causes the discs to engage or disengage.

16. The tandem wheel assembly of claim 15, wherein the actuator is a hydraulically driven piston, wherein activation of the hydraulically driven piston is controlled by a controller, the controller is configured to control the hydraulic pressure to the hydraulically driven piston.

17. The tandem wheel assembly of claim 15, further including an actuator comprising a spring configured to apply a bias force to engage the discs.

18. The tandem wheel end assembly of claim 15, further including:
a clutch housing fixedly attached to an outboard end of the pivot cage, the clutch housing defining a recess in which the clutch assembly is positioned, the discs engaging with the clutch housing;
a cover fixedly attached to an outboard wall of the tandem wheel housing; and
wherein the cover has a cylindrical projection extending into the clutch housing, the discs engaging with the cylindrical projection.

19. A tandem wheel assembly for a work vehicle having a chassis and wheels, the tandem wheel assembly comprising:
a tandem wheel housing defining a center opening extending along a pivot axis and wheel end openings extending along associated wheel end axes;
a pivot cage disposed within the center opening to allow the tandem wheel housing to pivot about the pivot axis, the pivot cage being fixedly mounted to the chassis;
a center sprocket disposed within the pivot cage and rotatable with respect to the tandem wheel housing;
wheel end assemblies each disposed at one of the wheel end openings, each wheel end assembly having a wheel end sprocket, a wheel end gear train including planetary gear set having a ring gear, and a wheel end hub, each wheel end sprocket being supported within the tandem wheel housing for rotation by at least one chain coupled to the center sprocket, each wheel end gear train being coupled for rotation by the associated wheel end sprocket and configured to effect a gear ratio change and rotate the associated wheel end hub about the associated wheel end axis;

a pair of reaction bars, each being pivotally coupled at a first end to the pivot cage at a location spaced from the pivot axis and at an opposite second end to the ring gear of the respective wheel end assembly; and a pivot dampening system configured to dampen the pivoting of the tandem wheel housing relative to the chassis, the pivot dampening system including a clutch assembly at least in part positioned axially between the tandem wheel housing and ring gear of the respective wheel end assembly, the clutch assembly having:

a plurality of discs some of which are rotationally fixed to the tandem wheel housing and some of which are fixed to the ring gear of the respective wheel end assembly; and an actuator positioned within the tandem wheel housing that causes the discs to engage or disengage.

20. The tandem wheel end assembly of claim 19, further including a clutch housing fixedly attached to the tandem wheel housing, the clutch housing defining a recess in which the clutch assembly is positioned.

* * * * *

UNITED STATES PATENT AND TRADEMARK OFFICE
CERTIFICATE OF CORRECTION

PATENT NO. : 11,376,956 B2
APPLICATION NO. : 17/075144
DATED : July 5, 2022
INVENTOR(S) : Fliearman et al.

Page 1 of 1

It is certified that error appears in the above-identified patent and that said Letters Patent is hereby corrected as shown below:

In the Claims

In Column 21, Claim 2, Line 9, delete "of of" and insert -- of --, therefor.

In Column 22, Claim 18, Line 38, delete "wheel end" and insert -- wheel --, therefor.

In Column 23, Claim 20, Line 20, delete "wheel end" and insert -- wheel --, therefor.

Signed and Sealed this
Twenty-ninth Day of November, 2022

Katherine Kelly Vidal
*Director of the United States Patent and Trademark Office*